United States Patent
Wang

(10) Patent No.: US 12,513,653 B2
(45) Date of Patent: Dec. 30, 2025

(54) METHODS FOR COMMUNICATION, TERMINAL DEVICE, NETWORK DEVICE, AND COMPUTER READABLE MEDIA

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 700 days.

(21) Appl. No.: 17/764,300

(22) PCT Filed: Sep. 29, 2019

(86) PCT No.: PCT/CN2019/109095
§ 371 (c)(1),
(2) Date: Mar. 28, 2022

(87) PCT Pub. No.: WO2021/056547
PCT Pub. Date: Apr. 1, 2021

(65) Prior Publication Data
US 2022/0377698 A1    Nov. 24, 2022

(51) Int. Cl.
*H04W 64/00*    (2009.01)
*G01S 19/48*    (2010.01)

(52) U.S. Cl.
CPC ........... *H04W 64/003* (2013.01); *G01S 19/48* (2013.01)

(58) Field of Classification Search
CPC .............................. H04W 64/003; G01S 19/48
See application file for complete search history.

(56) References Cited

U.S. PATENT DOCUMENTS

| 2003/0072306 A1* | 4/2003 | Hunzinger | G01S 5/0289 |
| | | | 370/252 |
| 2011/0111726 A1* | 5/2011 | Kholaif | H04W 76/50 |
| | | | 455/456.2 |

(Continued)

FOREIGN PATENT DOCUMENTS

| CN | 108401225 A | 8/2018 |
| WO | 2019/170866 A1 | 9/2019 |

OTHER PUBLICATIONS

"Location report in NTN", ZTE Corporation, Sanechips, R2-1909266, 3GPP TSG-RAN WG2 Meeting#107, Aug. 26-30, 2019, pp. 1-4, Prague, Czech.

(Continued)

*Primary Examiner* — Barry W Taylor
(74) *Attorney, Agent, or Firm* — Sughrue Mion, PLLC

(57) ABSTRACT

Embodiments of the present disclosure provide a solution for location determining and reporting of a terminal device and a mobility measurement report based on a location of a terminal device. In a method for communication, a first terminal device incapable of using a satellite positioning system receives, from a second terminal device capable of using the satellite positioning system, a first message indicating a first time point of the satellite positioning system when the first message is transmitted. The first terminal device transmits, to the second terminal device, a responsive message to the first message after a predefined delay from receiving the first message. The first terminal device receives, from the second terminal device, a second message indicating a reference time point of the satellite positioning system when the second message is received by the first terminal device. With the embodiments of the present disclosure, a terminal device incapable of using a satellite positioning system can determine its accurate location and (Continued)

report the location to a network device, so as to optimize the mobility management of the terminal device.

6 Claims, 12 Drawing Sheets

(56) References Cited

U.S. PATENT DOCUMENTS

| | | | | |
|---|---|---|---|---|
| 2016/0066147 | A1* | 3/2016 | Venkatraman | H04W 24/10 |
| | | | | 455/456.2 |
| 2022/0038964 | A1* | 2/2022 | Wang | H04W 36/328 |
| 2022/0120840 | A1* | 4/2022 | Liberg | H04B 7/1851 |
| 2023/0224749 | A1* | 7/2023 | Li | H04W 36/302 |
| | | | | 370/252 |
| 2023/0396323 | A1* | 12/2023 | Yavuz | H04B 7/18513 |
| 2023/0397032 | A1* | 12/2023 | Yavuz | H04W 36/322 |
| 2025/0119781 | A1* | 4/2025 | Kim | G01S 19/42 |

OTHER PUBLICATIONS

"Mobility Challenges in Non-Terrestrial Networks (NTN)", InterDigital Inc., Nomor Research, Thales, MediaTek, R2-1908244, 3GPP RAN WG2 Meeting #106, May 13-17, 2019, 14 pages, Reno, United States.

International Search Report for PCT/CN2019/109095 dated Apr. 28, 2020 (PCT/ISA/210).

Written Opinion for PCT/CN2019/109095 dated Apr. 28, 2020 (PCT/ISA/237).

* cited by examiner

METHODS FOR COMMUNICATION, TERMINAL DEVICE, NETWORK DEVICE, AND COMPUTER READABLE MEDIA

CROSS REFERENCE TO RELATED APPLICATIONS

This application is a National Stage of International Application No. PCT/CN2019/109095 filed Sep. 29, 2019.

FIELD

Embodiments of the present disclosure generally relate to the field of communication, and in particular, to a solution for location determining and reporting of a terminal device and a mobility measurement report based on a location of a terminal device.

BACKGROUND

The latest developments of the 3GPP standards are referred to as Long Term Evolution (LTE) of Evolved Packet Core (EPC) network and Evolved Universal Mobile Telecommunications System (UMTS) Terrestrial Radio Access Network (E-UTRAN), also commonly termed as '4G.' In addition, the term '5G New Radio (NR)' refers to an evolving communication technology that is expected to support a variety of applications and services. The 5G NR is part of a continuous mobile broadband evolution promulgated by the Third Generation Partnership Project (3GPP) to meet new requirements associated with latency, reliability, security, scalability (for example, with Internet of Things), and other requirements. Some aspects of the 5G NR may be based on the 4G Long Term Evolution (LTE) standards.

3GPP has the following agreement on user equipment (UE) location report in Radio Access Network (RAN) Working Group 2 (WG2) RAN2 #105bis. A non-terrestrial network (NTN) should support both, UEs supporting Global Navigation Satellite Systems (GNSS) based positioning methods and UE not supporting GNSS based positioning methods. Also, 3GPP has the following agreement on UE location report in RAN3 #103. Country identification is one more use case identified where UE positioning information would be useful to identify right policies and charging rules. In addition, RAN2 confirmed UE location reporting should be introduced in a non-terrestrial network to aid mobility management. However, by far there is no UE originated location reporting rules. RAN2 contributions disclosed some simple rules, but not discussed yet.

SUMMARY

In general, example embodiments of the present disclosure provide a solution for location determining and reporting of a terminal device and a mobility measurement report based on a location of a terminal device.

In a first aspect, there is provided a method for communication. The method comprises: receiving, at a first terminal device incapable of using a satellite positioning system, from a second terminal device capable of using the satellite positioning system, a first message indicating a first time point of the satellite positioning system when the first message is transmitted. The method also comprises: transmitting, to the second terminal device, a responsive message to the first message after a predefined delay from receiving the first message, such that the second terminal device determines a radio transmission delay between the first terminal device and the second terminal device based on the first time point, the predefined delay and a second time point of the satellite positioning system when the responsive message is received by the second terminal device. The method further comprises: receiving, from the second terminal device, a second message indicating a reference time point of the satellite positioning system when the second message is received by the first terminal device, the reference time point being determined based on the radio transmission delay and a third time point of the satellite positioning system when the second message is transmitted.

In a second aspect, there is provided a method for communication. The method comprises: transmitting, to a first terminal device and at a second terminal device, a first message indicating a first time point of a satellite positioning system when the first message is transmitted, the first terminal device being incapable of using the satellite positioning system, the second terminal device being capable of using the satellite positioning system. The method also comprises: in accordance with a determination that a responsive message to the first message is received from the first terminal device, determining a second time point of the satellite positioning system when the responsive message is received. The method also comprises: determining a radio transmission delay between the first terminal device and the second terminal device, based on the first time point, the second time point, and a predefined delay between receiving the first message and transmitting the responsive message. The method further comprises: transmitting, to the first terminal device, a second message indicating a reference time point of the satellite positioning system when the second message is received by the first terminal device, the reference time point being determined based on the radio transmission delay and a third time point of the satellite positioning system when the second message is transmitted.

In a third aspect, there is provided a method for communication. The method comprises: receiving, at a terminal device capable of using a satellite positioning system, from a further terminal device incapable of using the satellite positioning system, a request for a location of the terminal device. The method also comprises: transmitting a response to the request to the further terminal device after a predefined delay from receiving the request, the response including the location of the terminal device and a transmitting time point of the satellite positioning system when the response is transmitted.

In a fourth aspect, there is provided a method for communication. The method comprises: receiving, at a first terminal device incapable of using a satellite positioning system, from a second terminal device capable of using the satellite positioning system, an indication of a location of the second terminal device. The method also comprises: transmitting, to a network device, location information indicating the location of the second terminal device as an estimated location of the first terminal device.

In a fifth aspect, there is provided a method for communication. The method comprises: receiving, from a first terminal device at a second terminal device a request for a location of the second terminal device, the first terminal device being incapable of using a satellite positioning system, the second terminal device being capable of using the satellite positioning system, the request being broadcasted by the first terminal device. The method also comprises: in accordance with the request, transmitting an indication of the location of the second terminal device to the first terminal device.

In a sixth aspect, there is provided a method for communication. The method comprises: receiving, at a terminal device from a network device, control information instructing the terminal device to broadcast an indication of a location of the terminal device, the terminal device being capable of using a satellite positioning system. The method also comprises: in accordance with the control information, broadcasting the indication of the location of the terminal device.

In a seventh aspect, there is provided a method for communication. The method comprises: determining, at a network device, that a location of a terminal device capable of using a satellite positioning system is usable as an estimated location of a further terminal device incapable of using the satellite positioning system. The method also comprises: in accordance with the determination, transmitting control information to the terminal device instructing the terminal device to broadcast an indication of the location of the terminal device.

In an eighth aspect, there is provided a method for communication. The method comprises: transmitting, at a network device to a terminal device, an indication of a condition for the terminal device to transmit a mobility measurement report to the network device, the condition being associated with a location of the terminal device. The method also comprises: in accordance with a determination that the mobility measurement report is received from the terminal device, performing a mobility management on the terminal device based on the mobility measurement report.

In a ninth aspect, there is provided a method for communication. The method comprises: receiving, at a terminal device from a network device, an indication of a condition for the terminal device to transmit a mobility measurement report to the network device, the condition being associated with a location of the terminal device. The method also comprises: in accordance with a determination that the condition is satisfied, transmitting the mobility measurement report to the network device.

In a tenth aspect, there is provided a terminal device. The terminal device comprises a processor and a memory coupled to the processor and storing instructions thereon. The instructions, when executed by the processor, cause the terminal device to perform the method according to any of the first to sixth and ninth aspects.

In an eleventh aspect, there is provided a network device. The network device comprises a processor and a memory coupled to the processor and storing instructions thereon. The instructions, when executed by the processor, cause the network device to perform the method according to any of the seventh and eighth aspects.

In a twelfth aspect, there is provided a computer readable medium having instructions stored thereon. The instructions, when executed on at least one processor of a device, cause the device to carry out the method according to any of the first to sixth and ninth aspects.

In a thirteenth aspect, there is provided a computer readable medium having instructions stored thereon. The instructions, when executed on at least one processor of a device, cause the device to carry out the method according to any of the seventh and eighth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
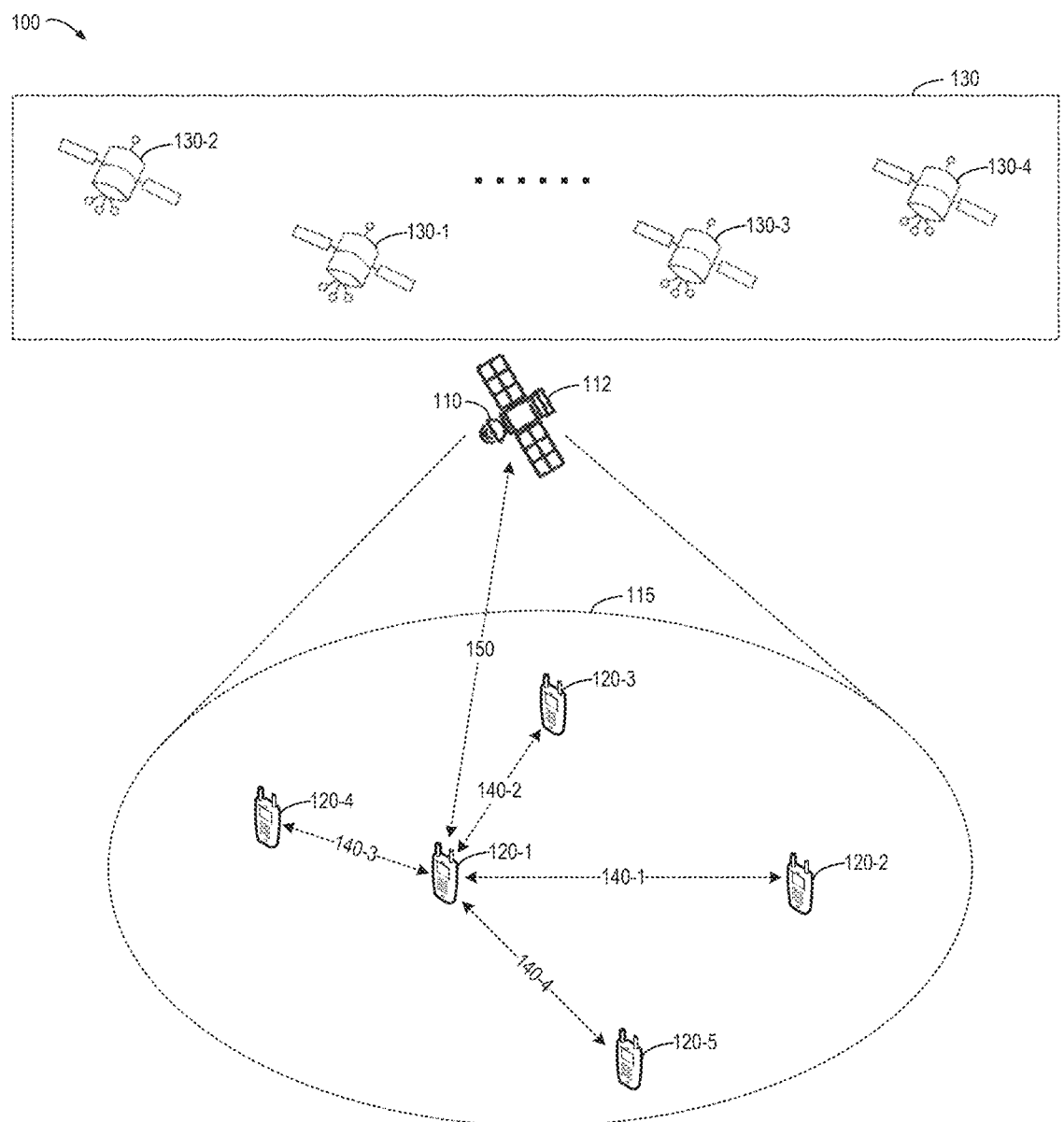
FIG. 1 is a schematic diagram of a communication environment in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), vehicle-mounted terminal devices, devices of pedestrians, roadside units, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In one embodiment, a terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is an eNB and the second RAT device is a gNB. Information related to different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 is a schematic diagram of a communication environment 100 in which some embodiments of the present disclosure can be implemented. As shown in FIG. 1, a first terminal device 120-1, a second terminal device 120-2, a third terminal device 120-3, a fourth terminal device 120-4, and a fifth terminal device 120-5 (collectively referred to as terminal devices 120) are in coverage 115 (also referred to as a cell 115) of a network device 110. In other words, the network device 110 may serve the terminal devices 120, and can provide wireless connections for them.

In particular, the first terminal device 120-1 may communicate with the network device 110 via a communication channel 150, and other terminal devices 120 can also communicate with the network device 110 via respective communication channels (not shown). For transmissions from the network device 110 to the first terminal device 120-1, the communication channel 150 may be referred to as a downlink channel, whereas for transmissions from the first terminal device 120-1 to the network device 110, the communication channel 150 may alternatively be referred to as an uplink channel. The uplink and downlink channels between the network device 110 and other terminal devices 120 may be similarly defined.

As shown, the network device 110 may be deployed on a satellite 112. Therefore, in contrast to a conventional terrestrial network, the communication environment 100 or communication network 100 may be termed as a non-terrestrial network, which refers to a network, or segment of networks using radio frequency (RF) resources on board a satellite (or Unmanned Aerial System, UAS, platform). More generally, non-terrestrial networks can be defined as networks, or segments of networks, using an airborne or space-borne vehicle to embark a transmission equipment relay node or base station. It is noted that although a non-terrestrial network is schematically depicted in FIG. 1, this depiction is only for example without suggesting any limitation. Embodiments of the present disclosure can be equally applicable to any communication networks including a terrestrial network, in which the network device 110 may be deployed on the land.

Additionally, the first terminal device 120-1 may communicate with the second terminal device 120-2 via a device-to-device (D2D) channel 140-1, which may also be referred to as a sidelink channel 140-1. In a similar way, the first terminal device 120-1 may communicate with the third terminal device 120-3 via a sidelink channel 140-2, with the fourth terminal device 120-4 via a sidelink channel 140-3, and with the fifth terminal device 120-5 via a sidelink channel 140-4. Further, the second terminal device 120-2, the third terminal device 120-3, the fourth terminal device 120-4, and the fifth terminal device 120-5 may also communicate with one another via a sidelink channel (not shown) between them.

In some cases, the network device 110 may be absent in the communication environment 100. For example, the first terminal device 120-1, the second terminal device 120-2, the third terminal device 120-3, the fourth terminal device 120-4, and the fifth terminal device 120-5 are out of the coverage 115 of the network device 110. In such cases, only sidelink communications exist among the first terminal device 120-1, the second terminal device 120-2, the third terminal device 120-3, the fourth terminal device 120-4, and the fifth terminal device 120-5 as well as possibly other terminal devices not shown in FIG. 1.

Among the terminal devices 120-1 to 120-5, there may be some terminal devices which are capable of using a satellite positioning system 130. Without loss of generality, it is assumed that the terminal devices 120-2 to 120-5 can use the satellite positioning system 130. In other words, these terminal devices can determine their locations using the satellite positioning system 130. In contrast, it is assumed that the first terminal device 120-1 is incapable of using the satellite positioning system 130. That is, the first terminal device 120-1 cannot use the satellite positioning system 130 to determine its location. As shown, the satellite positioning system 130 may include navigation satellites 130-1, 130-2, 130-2, 130-4 and possibly more navigation satellites (not shown), which can provide signals for the terminal devices 120-2 to 120-5 to determine their locations. Although not shown, the satellite positioning system 130 may include other devices or equipment on the earth for performing its functions.

In some embodiments, the satellite positioning system 130 may include the Global Navigation Satellite Systems (GNSS), which is the standard generic term for satellite navigation systems that provide autonomous geo-spatial positioning with global coverage. GNSS allows small electronic receivers to determine their location (longitude, latitude, and altitude) to within a few meters using time signals transmitted along a line-of-sight by radio from satellites. Receivers calculate the precise time as well as position, which can be used as a reference for scientific experiments.

The United States NAVSTAR Global Positioning System (GPS) is a fully operational GNSS. The Russian GLONASS is a GNSS in the process of being restored to full operation. The European Union's Galileo positioning system is a GNSS in initial deployment phase, scheduled to be operational in 2014. China has indicated it will expand its regional Beidou navigation system into the global Compass navigation system by 2015. Therefore, the satellite positioning system 130 may include any one or more of the GPS system, the BEIDOU system, the GALILEO system, the GLONASS system, any other future GNSS systems, and any combination thereof. The global coverage for each system is generally achieved by a constellation of 20 to 30 Medium Earth Orbit (MEO) satellites spread between several orbital planes. Therefore, in some embodiments, the satellite positioning system 130 can have 20 to 30 navigation satellites including the navigation satellites 130-1 to 130-4.

It should be understood that embodiments of the present disclosure are not limited to the example scenario of FIG. 1. In this regard, it is noted that although the terminal devices 120 are schematically depicted as mobile phones in FIG. 1, this depiction is only for example without suggesting any limitation. In other embodiments, the terminal devices 120 may be any other wireless communication devices, for example, vehicle-mounted terminal devices.

In the case that the terminal devices 120 are vehicle-mounted terminal devices, the communications relate to the terminal devices 120 may be referred to as V2X communications. More generally, although not shown in FIG. 1, a V2X communication related to the terminal devices 120 may comprise a communication between them and any other communication device, including but not limited to, an infrastructure device, another vehicle-mounted terminal device, a device of a pedestrian, a roadside unit, or the like. Furthermore, although not shown, all the communication links as shown in FIG. 1 may be via one or more relays.

It is to be understood that the number of communication devices and the number of satellites as shown in FIG. 1 are only for the purpose of illustration without suggesting any limitations. The communication environment 100 may include any suitable number of communication devices and any suitable number of satellites adapted for implementing embodiments of the present disclosure. In addition, it would be appreciated that there may be various wireless communications as well as wireline communications (if needed) among these additional communication devices.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, in conventional solutions, RAN2 confirmed UE location reporting should be introduced in a non-terrestrial network to aid mobility management. From RAN3 point of view, country identification is one more use case identified where UE positioning information would be useful to identify right policies and charging rules. However, by far there is no UE originated location reporting rules. RAN2 contributions disclosed some simple rules, but not discussed yet.

On the other hand, regarding country/state/province based reporting trigger of a measurement report, if there is a GNSS module embedded in a UE. The UE can trigger location reporting when it goes into another country/state/province, due to different policy/charging rules. This trigger only applies to the UEs with a GNSS module embedded. Such a UE internally stores the map of country/state/province. Else, if there is no GNSS module embedded in a UE. The UE may detect the signaling of a territorial base station (both LTE and NR), in order to explicitly achieve the location of the country/state/province, by decoding the PLMN information broadcasted by territorial base station. However, the location determined in this way has a great error compared to the actual location. In other words, traditional solutions cannot obtain an accurate location of a UE without a GNSS module, and thus cannot facilitate the mobility management of the UE.

In order to solve the above technical problems and potentially other technical problems in conventional solutions, embodiments of the present disclosure provide a solution for location determining and reporting of a terminal device and a mobility measurement report based on a location of a terminal device. With the embodiments of the present disclosure, a terminal device incapable of using a satellite positioning system can determine its accurate location and report the location to a network device, so as to optimize the mobility management of the terminal device. Principles and implementations of the present disclosure will be described in detail below.

As described above, it is assumed that the first terminal device 120-1 in FIG. 1 is incapable of using the satellite positioning system 130. For example, the first terminal device 120-1 may be not equipped with a GNSS module. This means that the first terminal device 120-1 cannot determine its location using the satellite positioning system 130.

In such a case, in some embodiments, the first terminal device 120-1 may first determine a reference time point of the satellite positioning system 130 through communications with a terminal device capable of using the satellite positioning system 130, for example, a UE mounted with a GNSS module, also termed as a GNSS embedded UE. The reference time point of the satellite positioning system 130 may be considered as an accurate time point, and thus can be further used to determine the location of the first terminal device 120-1. In the following, all the time points as described herein refer to time points of the satellite positioning system 130, unless explicitly stated otherwise.

Then, with this reference time point of the satellite positioning system 130, the first terminal device 120-1 can determine its accurate location through further communications with a plurality of terminal devices capable of using the satellite positioning system 130. For example, the first terminal device 120-1 can calculate its location using a geometric calculation, according to the locations of the plurality of terminal devices and the distances to these terminal devices. An example of determining the reference time point of the satellite positioning system 130 will be first described below with reference to FIG. 2.

Figure 2:
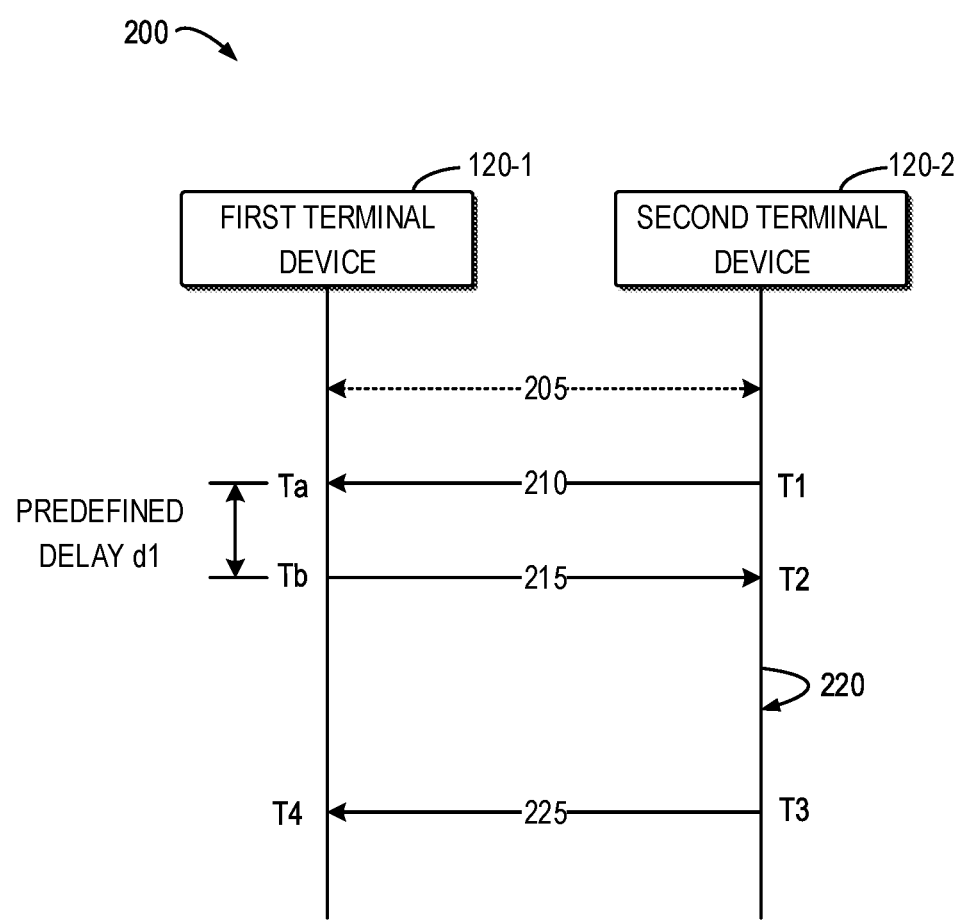
FIG. 2 shows an example communication process between a first terminal device and a second terminal device in accordance with some embodiments of the present disclosure.

FIG. 2 shows an example communication process 200 between the first terminal device 120-1 and the second terminal device 120-2 in accordance with some embodiments of the present disclosure. For the purpose of discussion, the communication process 200 will be described with reference to FIG. 1. However, it would be appreciated that the communication process 200 may be equally applicable to any other terminal devices as shown in FIG. 1. Further, it would be appreciated that the communication process 200 may be equally applicable to any other communication scenarios where a terminal device incapable of using a satellite positioning system and a terminal device capable of using a satellite positioning system communicate with each other.

As shown in FIG. 2, at a time point T1, the second terminal device 120-2 transmits 210 a first message to the first terminal device 120-1. The first message may indicate the time point T1 (also referred to as a first time point) of the satellite positioning system 130 when the first message is transmitted. At the receiving side, at a time point Ta, the first terminal device 120-1 receives 210 the first message from the second terminal device 120-2.

As used herein, the first message may also be termed as an "inaccurate GNSS time message," since the time point T1 is an inaccurate time point with respect to the time point Ta when the first terminal device 120-1 receives the first message. This is because when the first terminal device 120-1 obtains the GNSS time point T1 from the first message, a time length has elapsed (Ta>T1) due to the distance between the first terminal device 120-1 and the second terminal device 120-2 for a radio signal to travel. In the following, it is assumed that the duration elapsed for the radio transmission between the first terminal device 120-1 and the second terminal device 120-2 is x, which is also referred to as a radio transmission delay x. In some embodiments, the first message may include an identifier of the second terminal device 120-2, so that the first terminal device 120-1 can identify that the transmitting device of the first message is the second terminal device 120-2.

Then, after a predefined delay d1 from receiving the first message (namely the time point Ta), the first terminal device 120-1 transmits 215 a responsive message to the first message to the second terminal device 120-2. In other words, if the first terminal device 120-1 transmits 215 the responsive message at a time point Tb, then the delay d1=Tb−Ta is a predefined delay d1 known to both the first terminal device 120-1 and the second terminal device 120-2. In some embodiments, the predefined delay d1 may be a processing delay for the first terminal device 120-1 to process the first message, prepare the transmission of the responsive message, or other related operations. For example, the delay d1 may be predefined as 4 ms or any other pre-defined value. In addition, as used herein, the responsive message to the first message may also be termed as an "inaccurate GNSS time response message."

Upon receiving 215 the responsive message from the first terminal device 120-1, the second terminal device 120-2 can determine a time point T2 (also referred to as a second time point) of the satellite positioning system 130 when the responsive message is received. Then, the second terminal device 120-2 determines 220 the radio transmission delay x between the first terminal device 120-1 and the second terminal device 120-2, based on the first time point T1, the second time point T2, and the predefined delay d1 between receiving the first message (Ta) and transmitting the responsive message (Tb). For example, an equation can be obtained as T2−T1=2x+d1, with the values of T1, T2, and d1 are known to the second terminal device 120-2. Thus, the second terminal device 120-2 can calculate the radio transmission delay x according to the equation.

After obtaining the radio transmission delay x, the second terminal device 120-2 transmits 225 a second message to the first terminal device 120-1 at a time point T3 (also referred to as a third time point). The second message indicates a reference time point T4 of the satellite positioning system 130 when the second message is received by the first terminal device 120-1. Accordingly, the first terminal device 120-1 receives 225 the second message from the second terminal device 120-2 at the time point T4. As used herein, the second message may also be termed as an "accurate GNSS time message," since the time point T4 is an accurate time point of the satellite positioning system 130 for the first terminal device 120-1 when receiving the second message.

In other words, the time point T4 when the first terminal device 120-1 receives the second message is indicated in the second message. Thus, when the first terminal device 120-1 receives the second message, it can determine that the moment when receiving the second message is the time point T4 of the satellite positioning system 130. For this purpose, the reference time point T4 is determined based on the radio transmission delay x and the third time point T3 of the satellite positioning system 130 when the second message is transmitted by the second terminal device 120-2. In this way, the first terminal device 120-1 which is incapable of using the satellite positioning system 130 can obtain an accurate reference time point T4 of the satellite positioning system 130.

Alternatively or additionally, the second terminal device 120-2 can inform the first terminal device 120-1 of the radio transmission delay x and the time point T3 via the second message. Thus, when receiving the second message, the first terminal device 120-1 may obtain the radio transmission delay x and the time point T3, and can then determine the time point T4 by summing the radio transmission delay x and the time point T3. In this way, the first terminal device 120-1 can know the radio transmission delay x in addition to the reference time point T4 of the satellite positioning system 130.

In some embodiments, before the second terminal device 120-2 transmits 210 the first message to the first terminal device 120-1, the two terminal devices may be synchronized 205 with each other using a sidelink synchronization procedure. For example, the sidelink synchronization procedure may be similar to a legacy sidelink synchronization process as defined in the existing 3GPP specifications. In this way, the resulting reference time point T4 of the satellite positioning system 130 finally determined by the first terminal device 120-1 can be more accurate.

After determining the reference time point T4 of the satellite positioning system 130, the first terminal device 120-1 can determine its location through further communications with a plurality of terminal devices capable of using the satellite positioning system 130. For example, the first terminal device 120-1 can calculate its location using a geometric calculation, according to the locations of the plurality of terminal devices and the distances to these terminal devices. In such a manner, the first terminal device 120-1 incapable of using the satellite positioning system 130 can determine its accurate location. Examples of determining the location of the first terminal device 120-1 will be described below with reference to FIGS. 3A-3B.

Figure 3A:
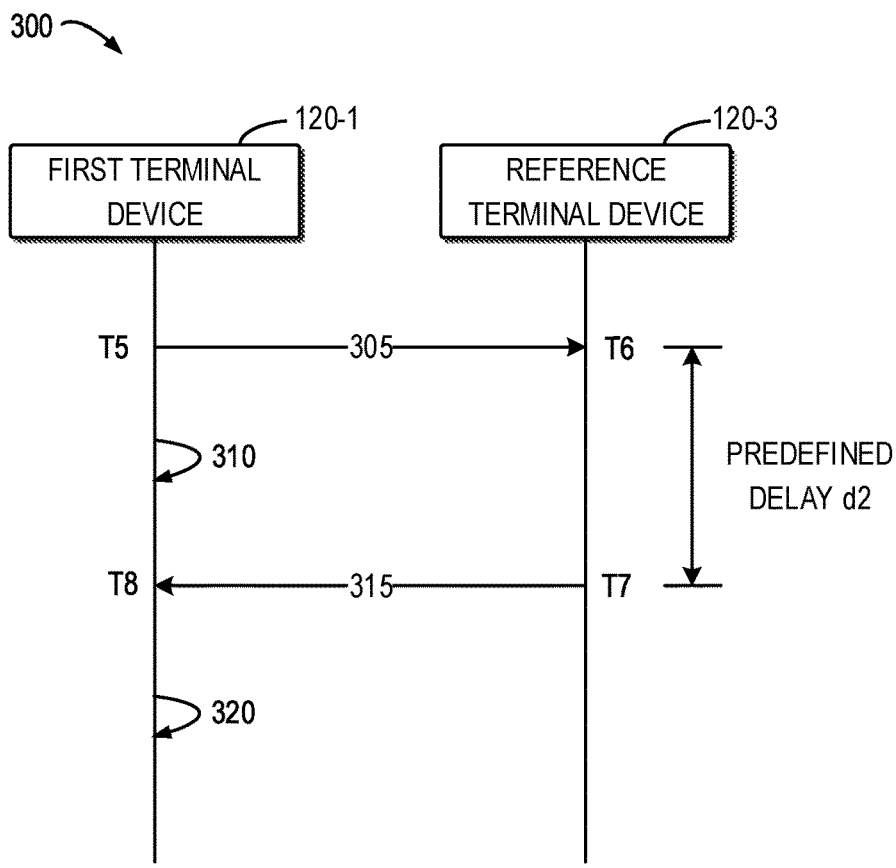
FIG. 3A shows an example communication process between a first terminal device and a reference terminal device in accordance with some embodiments of the present disclosure.

FIG. 3A shows an example communication process 300 between the first terminal device 120-1 and a reference terminal device 120-3 in accordance with some embodiments of the present disclosure. For the purpose of discussion, the communication process 300 will be described with reference to FIG. 1. However, it would be appreciated that the communication process 300 may be equally applicable to any other terminal devices as shown in FIG. 1. Further, it would be appreciated that the communication process 300 may be equally applicable to any other communication scenarios where a terminal device incapable of using a satellite positioning system and a terminal device capable of using a satellite positioning system communicate with each other.

As shown in FIG. 3A, at a time point T5, the first terminal device 120-1 can broadcast 305 a request for locations of a plurality of reference terminal devices capable of using the satellite positioning system 130. As used herein, the time point T5 may also be referred to as a requesting time point and the request may be transmitted via a location request message. Accordingly, one of the reference terminal devices, such as the reference terminal device 120-3, may receive 305 the request at a time point T6.

Since the first terminal device 120-1 cannot use the satellite positioning system 130 and has previously obtained the reference time point T4 of the satellite positioning system 130, the first terminal device 120-1 may determine 310 the requesting time point T5 based on the reference time point T4. After a predefined delay d2 from receiving the request (namely T6), the reference terminal device 120-3 can transmit 315 a response to the request to the first terminal device 120-1, for example, via a location response message. The response may include the location of the reference terminal device 120-3 and a transmitting time point T7 of the satellite positioning system 130 when the response is transmitted by the reference terminal device 120-3. The predefined delay d2 may be set to be the same as the predefined delay d1 or different from the delay d1.

Accordingly, at a time point T8, the first terminal device 120-1 may receive 315 the response from the reference terminal device 120-3. Since the request for locations is broadcasted to a plurality of reference terminal devices, the reference terminal devices 120-4 and 120-5 and further reference terminal devices may similarly transmit respective responses to the request broadcasted by the first terminal device 120-1. Therefore, the first terminal device 120-1 may receive a set of responses to the request from a set of reference terminal devices. Each response may include a location of a reference terminal device in the set of reference terminal devices and a transmitting time point of the satellite positioning system 130 when the reference terminal device transmits the response.

Upon receiving the set of responses, the first terminal device 120-1 can determine 320 a location of the first terminal device 120-1 based on the set of responses. The first terminal device 120-1 can employ any suitable manners to determine its location according to the locations of the set of terminal devices and other information. For example, from the set of responses, the first terminal device 120-1 may obtain the locations of the reference terminal devices and the distances to these reference terminal devices, so that the first terminal device 120-1 can determine its location through a geometric calculation.

In particular, for a reference terminal device (such as the reference terminal device 120-3) in the set of reference terminal devices, the first terminal device 120-1 may determine a radio transmission delay y between the first terminal device 120-1 and the reference terminal device 120-3, based on the requesting time point T5, the time point T8, and a predefined delay d2 between receiving the request (time point T6) and the transmitting time point T7. For example, an equation can be obtained as T7−T5=y+d2, with the values of T7, T5 and d2 are known to the first terminal device 120-1. Thus, the first terminal device 120-1 can calculate the radio transmission delay y according to the equation. Alternatively, another equation can be obtained as T8−T5=2y+d2, with the values of T5, T8, and d2 are known to the first terminal device 120-1. Thus, the first terminal device 120-1 can calculate the radio transmission delay y according to the equation.

As a further option, the first terminal device 120-1 may directly obtain the radio transmission delay y through a further equation y=T8−T7, with the values of T7 and T8 are known to the first terminal device 120-1. In this event, the predefined delay d2 may be unnecessary. In other words, the reference terminal device 120-3 can transmit 315 a location response to the first terminal device 120-1 after any delay unknown to the first terminal device 120-1. Upon determining the radio transmission delay y, the first terminal device 120-1 may determine a distance between the first terminal device 120-1 and the reference terminal device 120-3 based on the radio transmission delay y.

After performing the same processing for other reference terminal devices in the set of reference terminal devices, the first terminal device 120-1 can calculate the location of the first terminal device 120-1 based on the locations of the set of reference terminal devices and the distances between the terminal device and the set of reference terminal devices, for example, through a geometric calculation, such as a triangulation. By using a geometric calculation, the first terminal device 120-1 can obtain its location in a relative simple calculation, thereby avoiding a need for a complicated positioning algorithm.

If the first terminal device 120-1 employs the triangulation to determine its location, three responses from three reference terminal devices may be enough for performing a triangulation. In other words, the set of the reference terminal devices transmitting responses to the first terminal device 120-1 may include at least three reference terminal devices. In such cases, if the set of responses received by the first terminal device 120-1 includes more than three responses, the first terminal device 120-1 may select three of the responses received with radio qualities higher than the rest of the set of responses for determining the location of the first terminal device 120-1. As such, the first terminal device 120-1 can use the responses received more reliably to determine its location.

Alternatively, the first terminal device 120-1 may select three responses received with radio transmission delays higher than the rest responses for determining the location of the first terminal device 120-1, for example, by evaluating the time points (or timestamps) included in the responses by the reference terminal devices. In this way, the first terminal device 120-1 can obtain its location more precisely, since with a longer propagation delay, a more accurate calculating result can be obtained.

In some embodiments, for a reference terminal device, the response is transmitted if a receiving quality of the request of the first terminal device 120-1 exceeds a predefined threshold. For example, all the reference terminal devices which receive the location request message from the first terminal device 120-1 with a received power or quality above a configurable threshold can transmit the response messages to the first terminal device 120-1. As such, other reference terminal devices which do not receive the location request message with a good quality may not transmit a response message, thereby saving power and signaling overhead of these reference terminal devices.

Figure 3B:
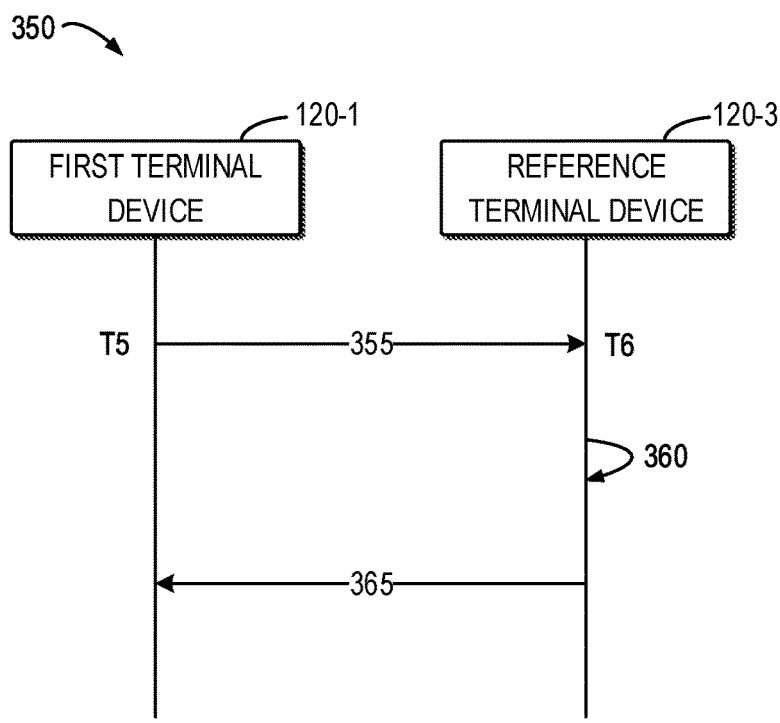
FIG. 3B shows another example communication process between a first terminal device and a reference terminal device in accordance with some embodiments of the present disclosure.

FIG. 3B shows another example communication process 350 between the first terminal device 120-1 and the reference terminal device 120-3 in accordance with some embodiments of the present disclosure. For the purpose of discussion, the communication process 350 will be described with reference to FIG. 1. However, it would be appreciated that the communication process 350 may be equally applicable to any other terminal devices as shown in FIG. 1. Further, it would be appreciated that the communication process 350 may be equally applicable to any other communication scenarios where a terminal device incapable of using a satellite positioning system and a terminal device capable of using a satellite positioning system communicate with each other.

As shown in FIG. 3B, at a time point T5, the first terminal device 120-1 can broadcast 355 a request for locations of a plurality of reference terminal devices. Different from the embodiment of the communication process 300, the request may include the time point T5 of the satellite positioning system 130 when the request is broadcasted, so that a receiving device of the request may know when the request is transmitted. At a time point T6, the reference terminal device 120-3 may receive 355 the request, and can determine the time point T5 from the received request. In other words, the reference terminal device 120-3 can know both the time point T5 and the time point T6.

Then, the reference terminal device 120-3 may determine 360 the radio transmission delay y between the first terminal device 120-1 and the reference terminal device 120-3, namely, T6–T5. Based on the radio transmission delay y, the reference terminal device 120-3 can determine the distance between the first terminal device 120-1 and the reference terminal device 120-3. Afterwards, the reference terminal device 120-3 can transmit 365 a response to the request to the first terminal device 120-1. The response may include the location of the reference terminal device 120-3 and the determined distance, such that the first terminal device 120-1 obtains the location of the reference terminal device 120-3 and the distance between the first terminal device 120-1 and the reference terminal device 120-3. As such, the distances to a plurality of reference terminal devices can be calculated at the respective reference terminal devices instead of collectively calculating by the first terminal device 120-1, thereby saving the computing resource and power of the first terminal device 120-1.

In a similar way, each of other reference terminal devices, such as the reference terminal device 120-4 or 120-5 can inform the first terminal device 120-1 of its location and the distance between the first terminal device 120-1 and the reference terminal device. With at least three locations of the reference terminal devices and distances to them, the first terminal device 120-1 can determine its location, for example, through the triangulation.

Analogous to the embodiment of the communication process 300, if the first terminal device 120-1 employs the triangulation to determine its location, three responses from three reference terminal devices may be enough for performing a triangulation. In other words, the set of the reference terminal devices transmitting responses to the first terminal device 120-1 may include at least three reference terminal devices. In such cases, if the set of responses received by the first terminal device 120-1 includes more than three responses, the first terminal device 120-1 may select three of the responses received with radio qualities higher than the rest of the set of responses for determining the location of the first terminal device 120-1. As such, the first terminal device 120-1 can use the responses received more reliably to determine its location.

Alternatively, the first terminal device 120-1 may select three responses received with radio transmission delays higher than the rest responses for determining the location of the first terminal device 120-1, for example, by evaluating the time points (or timestamps) included in the responses by the reference terminal devices. In this way, the first terminal device 120-1 can obtain its location more precisely, since with a longer propagation delay, a more accurate calculating result can be obtained.

Further, as mentioned above, in some embodiments, for a reference terminal device, the response is transmitted if a receiving quality of the request of the first terminal device 120-1 exceeds a predefined threshold. For example, all the reference terminal devices which receive the location request message from the first terminal device 120-1 with a received power or quality above a configurable threshold can transmit the response messages to the first terminal device 120-1. As such, other reference terminal devices which do not receive the location request message with a good quality may not transmit a response message, thereby saving power and signaling overhead of these reference terminal devices.

The forgoing describes some embodiments for determining an accurate location of a terminal device incapable of using a satellite positioning system. In some other embodiments, a terminal device can report an estimated location instead of an accurate location to a network device, so as to avoid the complexity of obtaining an accurate location of the terminal device. In the following, example of these embodiments will be described below with reference to FIGS. 4 and 5.

Figure 4:
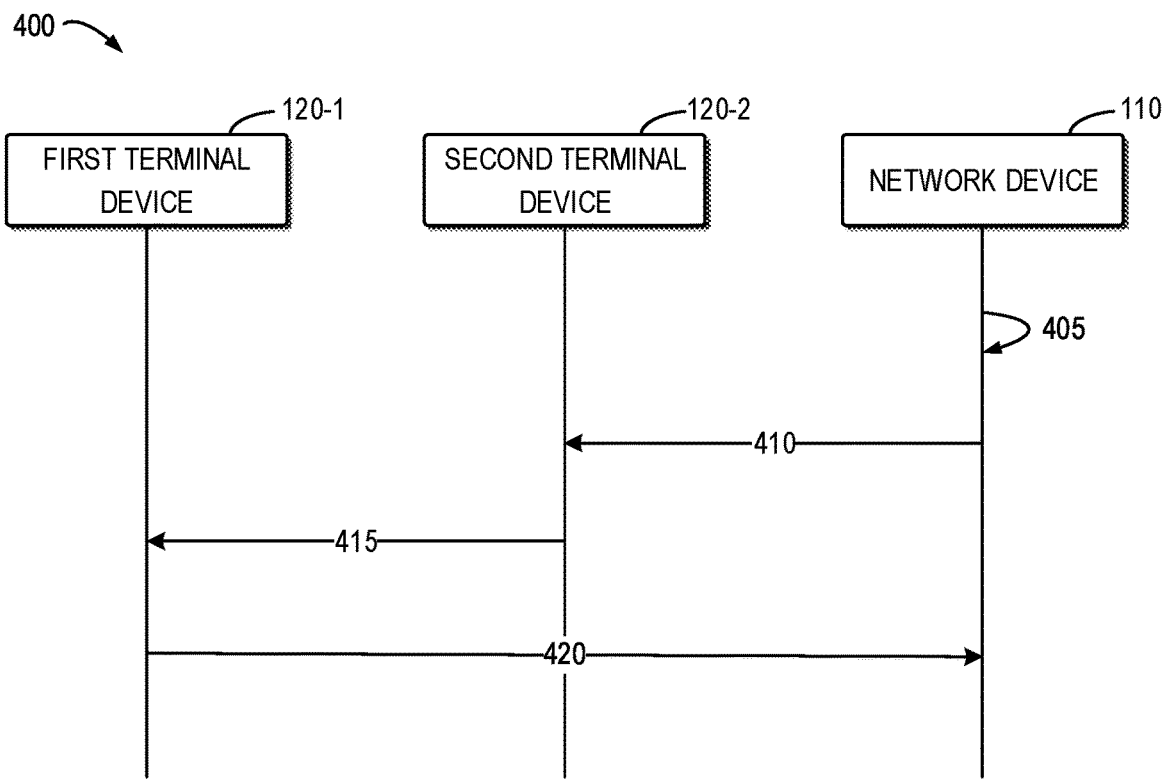
FIG. 4 shows an example communication process among a first terminal device, a second terminal device, and a network device in accordance with some embodiments of the present disclosure.

FIG. 4 shows an example communication process 400 among the first terminal device 120-1, the second terminal device 120-2, and the network device 110 in accordance with some embodiments of the present disclosure. For the purpose of discussion, the communication process 400 will be described with reference to FIG. 1. However, it would be appreciated that the communication process 400 may be equally applicable to any other terminal devices as shown in FIG. 1. Further, it would be appreciated that the communication process 400 may be equally applicable to any other communication scenarios where a terminal device incapable of using a satellite positioning system, a terminal device capable of using a satellite positioning system and a network device communicate with one another.

As shown in FIG. 4, the network device 110 may determine 405 that a location of the second terminal device 120-2 is usable as an estimated location of the first terminal device 120-1. In other words, since the first terminal device 120-1 cannot determine its location and the second terminal device 120-2 can determine its location, if the second terminal device 120-2 is in proximity to the first terminal device 120-1, the first terminal device 120-1 can use the location of the second terminal device 120-2 as its estimated location. In this way, the complexity of determining the accurate location of the first terminal device 120-1 can be prevented.

In the above determination 405, the network device 110 may consider various factors. As an example, the number of terminal devices in an area in a cell of the network device 110 may be a factor to be considered by the network device 110. For example, for an area of a predefined size, if a great number of terminal devices are to broadcast their locations, there would be much interference in the area. Thus, for one such area, the network device 110 may configure one terminal device to broadcast its location, so as to reduce the potential interference while ensuing in each area there is a terminal device broadcasting its location. By defining such areas, the network device 110 can improve the accuracy of the estimated location of first terminal device 120-1 by reducing the predefined size of the area.

In contrast, if a small number of terminal devices are located in an area, the network device 110 can configure all the terminal devices capable of using the satellite positioning system 130 to broadcast their locations, so that a terminal device incapable of using the satellite positioning system 130 can use the location of the nearest terminal device capable of using the satellite positioning system 130, thereby improving the accuracy of the estimated location of the terminal device incapable of using the satellite positioning system 130.

Alternatively or additionally, in the above determination 405, the network device 110 may also consider capabilities of the terminal devices in the area regarding using the satellite positioning system, since the capabilities of the terminal devices may influence the selection of the terminal devices to broadcast their locations.

Alternatively or additionally, the network device 110 may also consider types of satellite positioning system supported by the terminal devices in the area. For example, a terminal device may be capable of using a plurality of types of satellite positioning system, such as, the GPS system, the BEIDOU system, the GALILEO system, the GLONASS system, or the like. In other words, one terminal device is possible to be equipped with more than one GNSS module with different types. In such a case, the types of satellite positioning system supported by the terminal devices may also affect the selection of the terminal devices to broadcast their locations determined by a particular type of satellite positioning system.

To this end, in some embodiments, the network device 110 can request the terminal devices in its coverage 115 to report their capabilities whether they support a GNSS module, and what type of GNSS module is embedded, for example, a GPS module, a BEIDOU module, a GALILEO module, a GLONASS module, or the like. In this manner, the network device 110 can better make the determination 405.

Based on the determination 405, the network device 110 may transmit 410 to the second terminal device 120-2 control information, which can instruct the second terminal device 120-2 to broadcast an indication of the location of the terminal device 120-2. For example, the control information may be transmitted via a location assist configuration message. Accordingly, the second terminal device 120-2 can receive 410 the control information from the network device 110.

Upon receiving 410 the control information, the second terminal device 120-2 may broadcast 415 the indication of the location of the second terminal device 120-2. For example, the indication may be transmitted via a location broadcasting information message, which may include an identifier of the second terminal device 120-2 and coordinates of the location of second terminal device 120-2. At the receiving side, the first terminal device 120-1 may receive 415 the indication from the second terminal device 120-2.

Upon receiving 415 the indication of the location of the second terminal device 120-2, the first terminal device 120-1 may transmit 420, to the network device 110, location information indicating the location of the second terminal device 120-2 as an estimated location of the first terminal device 120-1. In other words, upon the reception of location broadcasting information message from the second terminal device 120-2, the first terminal device 120-1 then assumes that the second terminal device 120-2 is in proximity. Thus, the first terminal device 120-1 can report the location of the second terminal device 120-2 to the network device 110.

In some embodiments, the control information transmitted by the network device 110 to the second terminal device 120-2 may contain a power or a periodicity or both for broadcasting the indication. Thus, the indication of the location of the second terminal device 120-2 can be broadcasted with the power or the periodicity as indicated by the network device 110. By selecting a proper broadcasting power, the network device 110 can control the receiving range of the indication of the location of the second terminal device 120-2. By selecting an appropriate periodicity, the network device 110 can reduce signaling overhead of a transmitting terminal device whiling ensuring a terminal device incapable of using the satellite positioning system 130 can timely receive a location of a near terminal device capable of using the satellite positioning system 130.

It the case that the second terminal device 120-2 is capable of using a plurality of types of satellite positioning system, the control information may also contain an indicated type of satellite positioning system for determining the location of the second terminal device 120-2. As such, the second terminal device 120-2 can broadcast its location determined using a particular satellite positioning system, so that the network device 110 can select the particular type of satellite positioning system associated with the estimated location reported by the first terminal device 120-1.

In some embodiments, the network device 110 can determine whether there is a terminal device uses the location of the second terminal device 120-2 as an estimated location. For example, if the first terminal device 120-1 uses the location of the second terminal device 120-2 and reports it to the network device 110, the first terminal device 120-1 can include an identifier of the second terminal device 120-2 in the location report.

If the network device 110 determines that no terminal device uses the location of the second terminal device 120-2 as an estimated location for a predefined duration, then the network device 110 can transmit further control information to the second terminal device 120-2. The control information may instruct the second terminal device 120-2 to broadcast the indication of the location of the second terminal device 120-2 using a higher power. Thus, upon receiving the further control information, the second terminal device 120-2 can broadcast the indication using the higher power, such that the receiving range of the indication can be extended. In this way, the possibility that the location of the second terminal device 120-2 is used as an estimated location of a terminal device incapable of using the satellite positioning system 130 can be increased.

The forgoing describes some embodiments in which a terminal device capable of using the satellite positioning system 130 broadcasts its location based on an instruction from a network device 110. As an alternative, the second terminal device 120-2 can transmit its location to the first terminal device 120-1 based on a request from the first terminal device 120-1. In other words, if a terminal device is not equipped with a GNSS module, the terminal device may request a proximate terminal device with a GNSS module to provide location information. As such, the location of a terminal device capable of using the satellite positioning system 130 is sent to a requested terminal device, and thus the inference due to broadcasting of the location of terminal devices can be reduced. Embodiments of this alternative will be described below with reference to FIG. 5.

Figure 5:
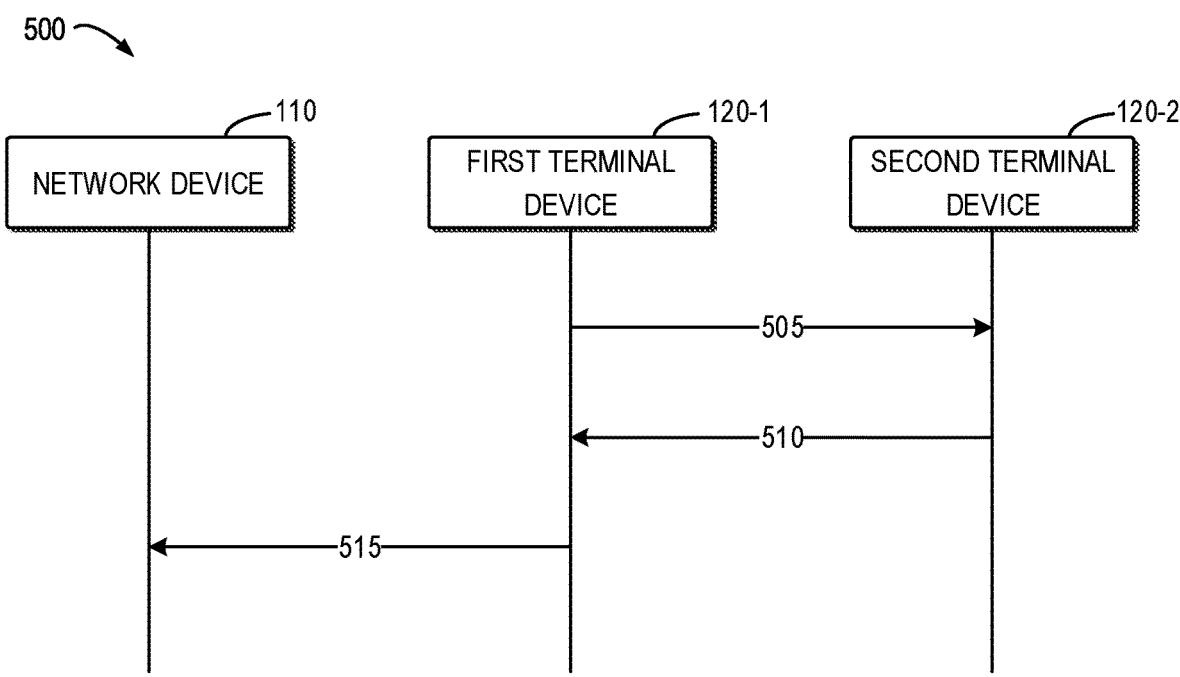
FIG. 5 shows another example communication process among a first terminal device, a second terminal device, and a network device in accordance with some embodiments of the present disclosure.

FIG. 5 shows another example communication process 500 among the first terminal device 120-1, the second terminal device 120-2, and the network device 110 in accordance with some embodiments of the present disclosure. For the purpose of discussion, the communication process 500 will be described with reference to FIG. 1. However, it would be appreciated that the communication process 500 may be equally applicable to any other terminal devices as shown in FIG. 1. Further, it would be appreciated that the communication process 500 may be equally applicable to any other communication scenarios where a terminal device incapable of using a satellite positioning system, a terminal device capable of using a satellite positioning system and a network device communicate with one another.

As shown in FIG. 5, the first terminal device 120-1 may broadcast 505 a request for locations of terminal devices capable of using the satellite positioning system 130. For example, the request may be broadcasted via a location request message in the sidelink channel 140-1. Due to the proximity to the first terminal device 120-1, the second terminal device 120-2 can receive 505 the request from the first terminal device 120-1.

Upon receiving 505 the request, the second terminal device 120-2 may transmit 510 an indication of the location of the second terminal device 120-2 to the first terminal device 120-1. For example, the indication may include GNSS coordinates of the second terminal device 120-2 obtained from the satellite positioning system 130. Accordingly, the first terminal device 120-1 can receive 510 the indication of the location of the second terminal device 120-2 from the second terminal device 120-2.

Upon receiving 510 the location of the second terminal device 120-2, the first terminal device 120-1 can transmit 515, to the network device 110, location information indicating the location of the second terminal device 120-2 as an estimated location of the first terminal device 120-1. In other words, the first terminal device 120-1 uses the location of the second terminal device 120-2 as its estimated location and reported to the network device 110.

Since the request is broadcasted by the first terminal device 120-1, a plurality of terminal devices may receive the request and transmit their locations to the first terminal device 120-1. In this event, if the first terminal device 120-1 determines that a plurality of indications of locations of a plurality of terminal devices are received, the first terminal device 120-1 may select a terminal device associated with one of the plurality of indications received with a highest quality as the second terminal device 120-2. That is, if the first terminal device 120-1 receives multiple locations, it can select a location from the location indication with the best signaling strength. This is because the location indication with the greatest signaling strength may be associated with the closest terminal device, which may provide a most accurate estimated location for the first terminal device 120-1.

In the forgoing, some embodiments of the present disclosure for location determining and reporting of a terminal device are described. In the following, some other embodiments of the present disclosure for a mobility measurement report based on a location of a terminal device will be introduced.

The inventor(s) finds that due to some factors, the mobility management of a terminal device may be different in a territorial network and in a non-territorial network. The first factor may be the deterministic movement of a satellite carrying a network device in a non-territorial network. For example, non-GEO satellites move at high speeds, but travel in deterministic orbits. In contrast, network devices in terrestrial systems are fixed, and any UE movement is considered as random.

The second factor may be the large cell size and overlapping between adjacent cells in a non-territorial network. The total footprint of satellite coverage consists of multiple spot beams with typical diameters much higher than those in a terrestrial setting, ranging from 200-1000 km in GEO deployments, and 100-500 km in LEO deployments.

The third factor may be the satellite/UE location information in a non-territorial network. Unlike in terrestrial networks, it is expected that satellites will periodically transmit ephemeris information, consisting of satellite location, direction, and velocity, or the like. As the size of the serving cell in terrestrial networks is almost negligible relative to non-terrestrial systems, any mobility solution taking into consideration location information, either of the UE or gNB, is unlikely to be addressed in a terrestrial context.

In view of the above various factors, it is observed that the reference signal received power (RSRP) or reference signal received quality (RSRQ) variation between cell center and edge can be the same in the non-terrestrial case. Therefore, a conventional manner of the mobility management, for example, an RSRP/RSRQ trigger for a terminal device to report a mobility measurement result (such as a particular measurement event as defined in the 3GPP specifications), may not be suitable in a non-territorial network. Thus, in some embodiments of the present disclosure, a trigger of a measurement report can be based on a location of a terminal device. That is, a network device in a non-terrestrial network can configure the location where a terminal device needs to send a measurement report to the network device. Some examples will be described below in detail with reference to FIGS. 6-8.

Figure 6:
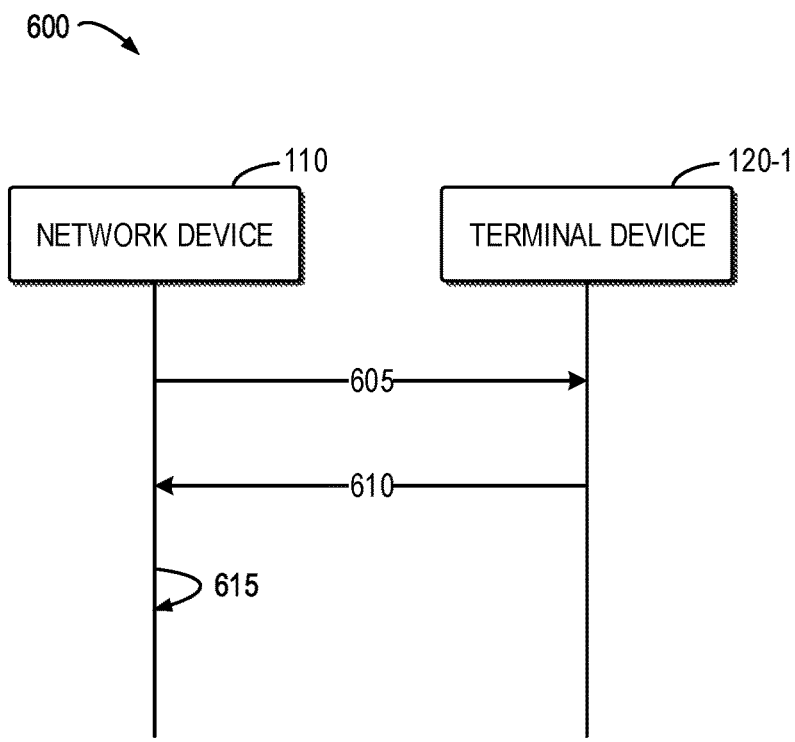
FIG. 6 shows an example communication process between a terminal device and a network device in accordance with some embodiments of the present disclosure.

FIG. 6 shows an example communication process 600 between the terminal device 120-1 and the network device 110 in accordance with some embodiments of the present disclosure. For the purpose of discussion, the communication process 600 will be described with reference to FIG. 1. However, it would be appreciated that the communication process 600 may be equally applicable to any other terminal devices as shown in FIG. 1. Further, it would be appreciated that the communication process 600 may be equally applicable to any other communication scenarios where a terminal device and a network device communicate with each other.

As shown in FIG. 6, the network device 110 transmits 605, to the terminal device 120-1, an indication of a condition for the terminal device 120-1 to transmit a mobility measurement report to the network device 110. At the receiving side, the terminal device 120-1 receives 605 the indication of the condition from the network device 110. As used herein, a mobility measurement report may refer to a measurement report transmitted by a terminal device to a network device for performing a mobility management on the terminal device, such as, a handover or the like. For example, a mobility measurement report may include a measurement result of a RSRP or RSRQ, and any other possible measurement results related to a mobility management. More generally, a mobility measurement report can have same content as any measurement report as defined in any existing or future 3GPP specifications or other standard specifications.

As mentioned above, the condition for transmitting a mobility measurement report can be associated with the location of the terminal device 120-1. For example, the condition may be that the location of the terminal device 120-1 is in an overlapping area of the network device 110 and a neighboring network device. In such a case, the network device 110 can inform the terminal device 120-1 of the overlapping area, and then the terminal device 120-1 can determine whether it locates in the overlapping area or not. As another example, the condition may be associated with a location relation between the terminal device 120-1 and the network device 110. This will be further detailed with reference to FIG. 7 in the following paragraphs.

The network device 110 can transmit the indication of the condition in various manners. For example, the network device 110 may transmit the indication to all the terminal devices within its coverage 115 individually. However, such a manner would introduce a great amount of signaling overhead, since the number of terminal devices served by the network device 110 may be huge, especially if the network device 110 is a gNB carried by a satellite 112 in a non-territorial network. In addition, since the condition may be based on a location of a terminal device, it is possible that a group of terminal devices or even all of the terminal devices within the coverage 115 can share a same condition for transmitting a mobility measurement report.

Therefore, in some embodiments, for transmitting the indication of the condition, the network device 110 can groupcast a signal including the indication to a group of terminal devices, and the signal may be scrambled using a groupcast identifier specific to the group of terminal devices. For example, the groupcast identifier may be a groupcast radio network temporary identifier (RNTI), or any other suitable existing or future identifiers. At the receiving side of the indication, in receiving the indication of the condition, any one of the group of terminal devices, for example, the terminal device 120-1 can descramble the groupcasted signal including the indication using the groupcast identifier.

Alternatively or additionally, for transmitting the indication of the condition, the network device 110 may broadcast the indication using a system information block (SIB). For example, the SIB can be an existing SIB or a new-designed SIB associated with a non-territorial network. At the receiving side of the indication, in receiving the indication of the condition, any one of the terminal devices in the coverage 115 of the network device 110, for example, the terminal device 120-1 can receive the indication in the SIB broadcasted by the terminal device 110.

If the terminal device 120-1 determines that the condition is satisfied, the terminal device 120-1 transmits 610 the mobility measurement report to the network device 110. As indicated, the condition may be based on the location of the terminal device 120-1. For determining whether the condition is satisfied, since the terminal device 120-1 is incapable of using the satellite positioning system 130, the terminal device 120-1 can use various approaches as proposed in the embodiments of the present application to determine its location. In other embodiments, if a terminal device is capable of using the satellite positioning system 130, such as one of the terminal devices 120-2 to 120-5 in FIG. 1, the terminal device can determine its location using the satellite positioning system 130.

As an example, if the condition is related to an overlapping area of the network device 110 and a neighboring network device, then the terminal device 120-1 can determine whether it locates in the overlapping area. If the terminal device 120-1 determines that it is located in the overlapping area, the terminal device 120-1 can determine that the condition configured by the network device 110 is satisfied. Then, the terminal device 120-1 can transmit the mobility measurement report.

Upon receiving 610 the mobility measurement report from the terminal device 120-1, network device 110 performs 615 a mobility management on the terminal device 120-1 based on the mobility measurement report. For example, the network device 110 can determine whether the terminal device 120-1 is to be handed over to a neighboring network device. More generally, the network device 110 may perform any operations related to the mobility management on the terminal device 120-1.

Figure 7:
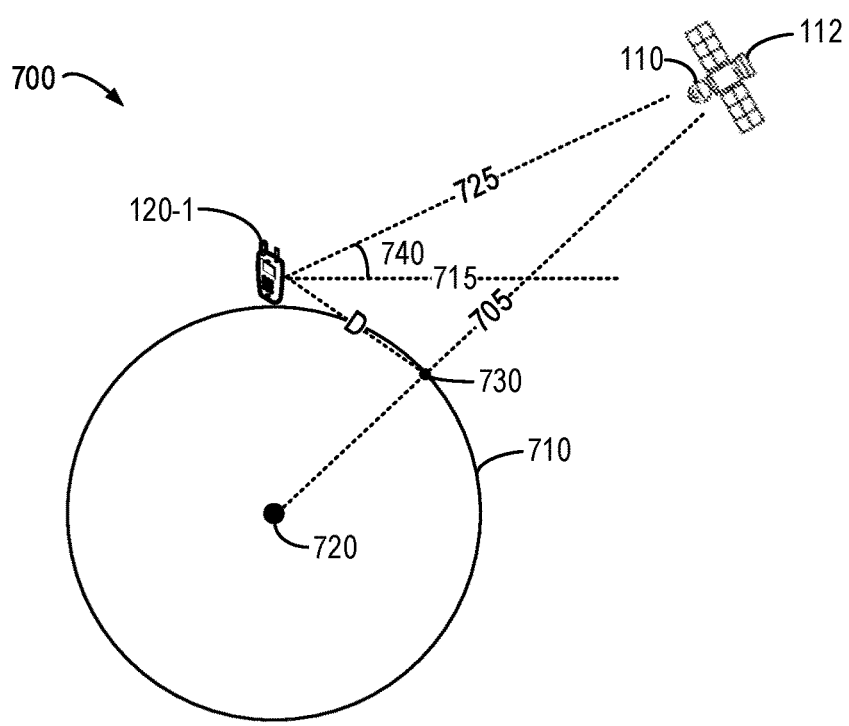
FIG. 7 shows a schematic diagram of location relations among a terminal device, a network device on a satellite, and the earth in accordance with some embodiments of the present disclosure.

As described above, the condition for transmitting a mobility measurement report may be alternatively or additionally associated with a location relation between the terminal device 120-1 and the network device 110. FIG. 7 shows a schematic diagram 700 of location relations among the terminal device 120-1, the network device 110 on the satellite 112, and the earth 710, in accordance with some embodiments of the present disclosure.

As shown in FIG. 7, the line 705 is a straight line between the satellite 112 and the center point 720 of the earth 710, and intersects the surface of the earth 710 at the point 730, which can be referred to as the sub-satellite point 730 (also known as the Nadir associated with the satellite 112). The line 725 is a straight line between the satellite 112 and the terminal device 120-1. The line 715 represents the horizontal direction of the terminal device 120-1. The angle between the line 715 and the line 725 represents an elevation angle 740 of the satellite 112 with respect to the terminal device 120-1.

In some embodiments, the condition for transmitting a mobility measurement report may be that the elevation angle 740 of the satellite 112 carrying the network device 110 with respect to the terminal device 120-1 is below a first threshold. This is because the elevation angle 740 can reflect a distance between the terminal device 120-1 and a center point of the coverage 115 of the network device 110. If the elevation angle 740 is below the first configurable threshold, the terminal device 120-1 may be far away from the center point of the coverage 115 of the network device 110. This may mean that the terminal device 120-1 is moving out of the coverage 115 of the network device 110, and entering into coverage of a neighboring network device. In this event, the terminal device 120-1 may need to transmit a mobility measurement report to the network device 110.

Alternatively or additionally, the condition for transmitting a mobility measurement report may be that a distance D to a sub-satellite point 730 of the satellite 112 exceeds a second threshold. This is because the distance D can also reflect a distance between the terminal device 120-1 and a center point of the coverage 115 of the network device 110. In this regard, it is noted that the center point of the coverage 115 may generally be near to the sub-satellite point 730. If the distance D exceeds the second configurable threshold, the terminal device 120-1 may be far away from the center point of the coverage 115 of the network device 110. This may mean that the terminal device 120-1 is moving out of the coverage 115 of the network device 110, and entering into coverage of a neighboring network device. In this event, the terminal device 120-1 may need to transmit a mobility measurement report to the network device 110.

In some embodiments, the condition for transmitting a mobility measurement report may be alternatively or additionally associated with a location relation between the terminal device 120-1 and a neighboring network device (not shown) of the network device 110. For example, such a neighboring network device may be carried by a neighboring satellite (not shown) of the satellite 112, and this neighboring satellite can also periodically transmit its ephemeris information, so that the terminal device 120-1 can determine the location of the neighboring satellite. In some further embodiments, the network device 110 may have a plurality of neighboring network devices carried by a plurality of neighboring satellites. In this event, the condition for the terminal device 120-1 to transmit a mobility measurement report to the network device 110 may be associated with respective location relations between the terminal device 120-1 and these neighboring network devices or neighboring satellites.

Thus, the condition for transmitting a mobility measurement report may be that an elevation angle of the neighboring satellite with respect to the terminal device 120-1 exceeds a third threshold. This is because the elevation angle can reflect a distance between the terminal device 120-1 and a center point of coverage of the neighboring network device. If the elevation angle exceeds the third configurable threshold, the terminal device 120-1 may be near enough to the center point of the coverage of the neighboring network device. This may mean that the terminal device 120-1 is moving out of the coverage 115 of the network device 110, and entering into the coverage of the neighboring network device. In this event, the terminal device 120-1 may need to transmit a mobility measurement report to the network device 110.

Alternatively or additionally, the condition for transmitting a mobility measurement report may be that a distance to a sub-satellite point of the neighboring satellite is below a fourth threshold. This is because the distance can also reflect a distance between the terminal device 120-1 and the center point of the coverage of the neighboring network device. In this regard, it is noted that the center point of the coverage of the neighboring network device may generally be near to the sub-satellite point of the neighboring satellite. If the distance to the sub-satellite point of the neighboring satellite is below the fourth configurable threshold, the terminal device 120-1 may be near to the center point of the coverage of the neighboring network device. This may mean that the terminal device 120-1 is moving out of the coverage 115 of the network device 110, and entering into the coverage of the neighboring network device. In this event, the terminal device 120-1 may need to transmit a mobility measurement report to the network device 110.

In the case that the condition is associated with the location relation between the terminal device 120-1 and the network device 110, the terminal device 120-1 can determine whether the condition is satisfied as follows. First, the terminal device 120-1 can receive, from the satellite 112, an indication of a location of the satellite 112. For example, as mentioned, the satellite 112 may periodically transmit its ephemeris information, and the terminal device 120-1 may determine the location of the satellite 112 from the ephemeris information. Then, as shown in FIG. 7, the terminal device 120-1 can determine the elevation angle 740 or the distance D to the sub-satellite point 730 based on the location of the satellite 112 and the location of the terminal device 120-1. Afterwards, the terminal device 120-1 may determine whether the elevation angle 740 is below the first threshold or whether the distance D to the sub-satellite point 730 exceeds the second threshold. In the case that the condition is associated with the location relation between the terminal device 120-1 and the neighboring network device of the network device 110, the terminal device 120-1 can determine whether the condition is satisfied in a similar way.

In some embodiments, the first configurable threshold and the second configurable threshold can be determined based on various factors by the network device 110. As an example, the network device 110 can configure the two thresholds based on an altitude of the satellite 112, since the altitude of the satellite 112 can affect the size of the coverage 115 of the network device 110. As another example, a footprint of a beam of the network device 110 can be used as a factor to determine the first threshold and the second threshold, since a larger footprint can provide larger coverage 115 of the network device 110.

Similarly, the third configurable threshold and the fourth configurable threshold can be determined based on various factors by the network device 110. As an example, the network device 110 can configure the two thresholds based on an altitude of the neighboring satellite of the satellite 112, since the altitude of the neighboring satellite can affect the size of the coverage of the neighboring network device of the network device 110. As another example, a footprint of a beam of the neighboring network device can be used as a factor to determine the third threshold and the fourth threshold, since a larger footprint can provide larger coverage of the neighboring network device of the network device 110.

In some embodiments, in order to facilitate the mobility management performed by the network device 110 on the terminal device 120-1, the terminal device 120-1 may transmit, along with the mobility measurement report, location information indicating the location of the terminal device 120-1 to the network device 110. Accordingly, the network device 110 may receive, from the terminal device 120-1 the location information along with the mobility measurement report. In other words, the location of the terminal device 120-1 can be also reported to the network device 110 along with the mobility measurement report, so that the network device 110 can better determine, for example, whether the terminal device 120-1 needs to be handed over to a neighboring network device.

In some embodiments, the location information transmitted by the terminal device 120-1 to the network device 110 may be the specific location of the terminal device 120-1. For example, the terminal device 120-1 may report full GNSS coordinates to the network device 110. However, such a report of the full GNSS coordinates may introduce great signaling overhead. In order to reduce the signaling overhead for the location reporting, the coverage 115 of the network device 110 may be divided into a plurality of zones of a predefined shape and size. Each of the zones may have a respective zone identifier (also termed as zone ID).

With the division of the coverage 115 into the zones, the terminal device 120-1 can determine which zone it is located in, and then report the zone ID of the zone to the network device 110. In other words, the location information transmitted by the terminal device 120-1 to the network device 110 may include a zone identifier of a predefined zone where the terminal device 120-1 is located in. Through reporting a zone ID instead of particular GNSS coordinates, the signaling overhead for the location reporting can be reduced dramatically. Examples of such zones will be further detailed below with reference to FIG. 8.

Figure 8:
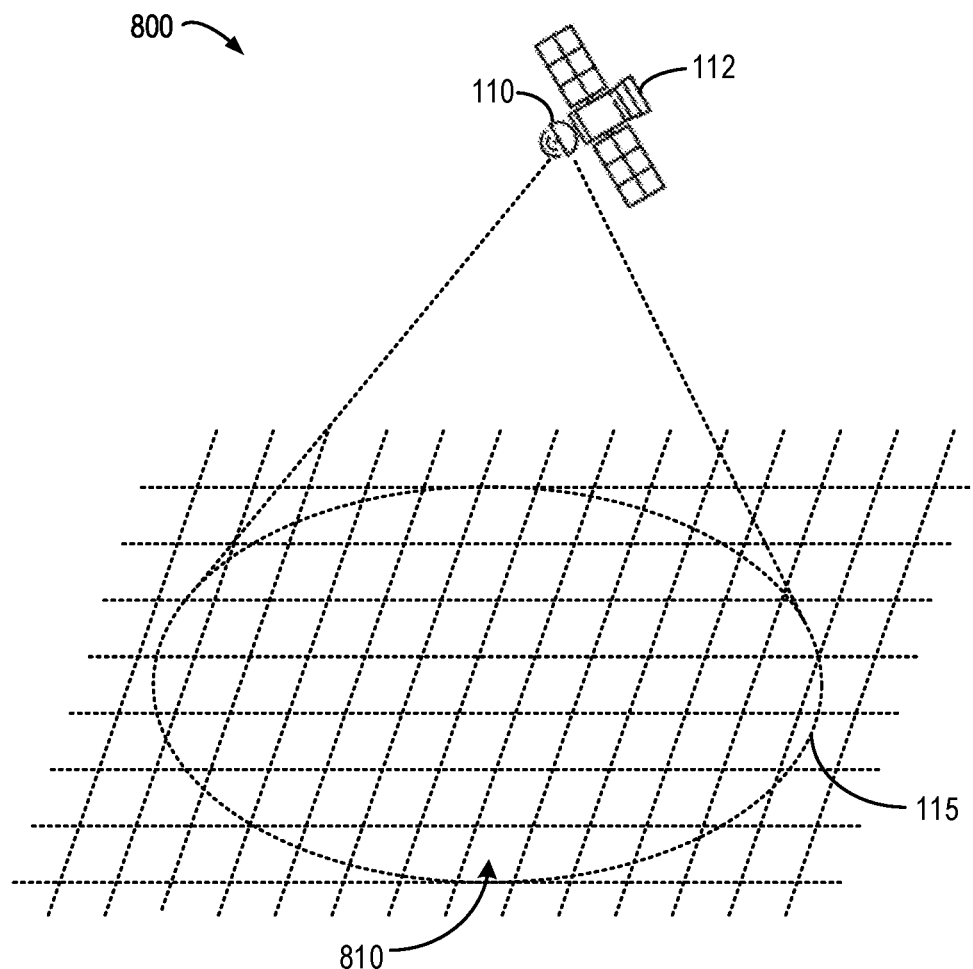
FIG. 8 shows a schematic diagram of predefined zones associated with a cell of a network device on a satellite in accordance with some embodiments of the present disclosure.

FIG. 8 shows a schematic diagram 800 of predefined zones associated with the cell 115 of the network device 110 on the satellite 112 in accordance with some embodiments of the present disclosure. As shown in FIG. 8, the cell 115 of the network device 110 can be divided into a plurality of zones and one such zone is referenced as 810. Each zone may start at a pre-defined starting coordinate point, and has a (pre)-configured length and a (pre)-configured width. Although the zones are depicted to have the same shape and size in FIG. 8, this depiction is only for example without suggesting any limitation. In some other embodiments, the zones in the cell 115 may have different shapes and sizes.

For example, a size of a predefined zone can be determined based on various factors. Thus, if the zone has a rectangle shape, then the length and width of the zone are configured based on these factors. As non-limiting examples, these factors may include, but not limited to, the number of terminal devices served by the network device (namely the density of the terminal devices in the coverage 115), an altitude of the satellite, the elevation angle of the satellite, a footprint of a beam of the network device, or the like. This is because these factors can affect the size of the cell 115, the possible density of terminal devices in each zone, and other performance related to the division of the cell 115 into the zones.

In some embodiments, the zone identifier of a zone may be globally unique, which means that all the zones in the world may be assigned with respective different identifiers. Each zone may be associated with a particular geographic region. In such embodiments, the reference coordinate point for the zones is (pre)-configured. With this (pre)-configured reference point, as well as the (pre)-configured length and width of a zone, the terminal device 120-1 can report the globally unique zone ID of the zone where it is located in, and the network device 110 may configure a list of zone IDs in which a terminal device needs to perform measurement reporting.

In some other embodiments, the zone identifier of a zone may be specific to the cell 115 of the network device 110 which means that a same zone identifier can be simultaneously used in different cells of different network devices. In these embodiments, the sub-satellite point 730 can be used as the reference coordinate point for the zones. In such embodiments, all the terminal devices in the cell 115 know the position/speed/direction of the network device 110, from the knowledge of ephemeris. With the limited number of zones, the network device 110 can broadcast/groupcast a list of zones in the edge of the cell 155, where a terminal device needs to perform measurement reporting. In this way, the signaling overhead for sending the list of zones is minimized using cell specific zone IDs.

Figure 9:
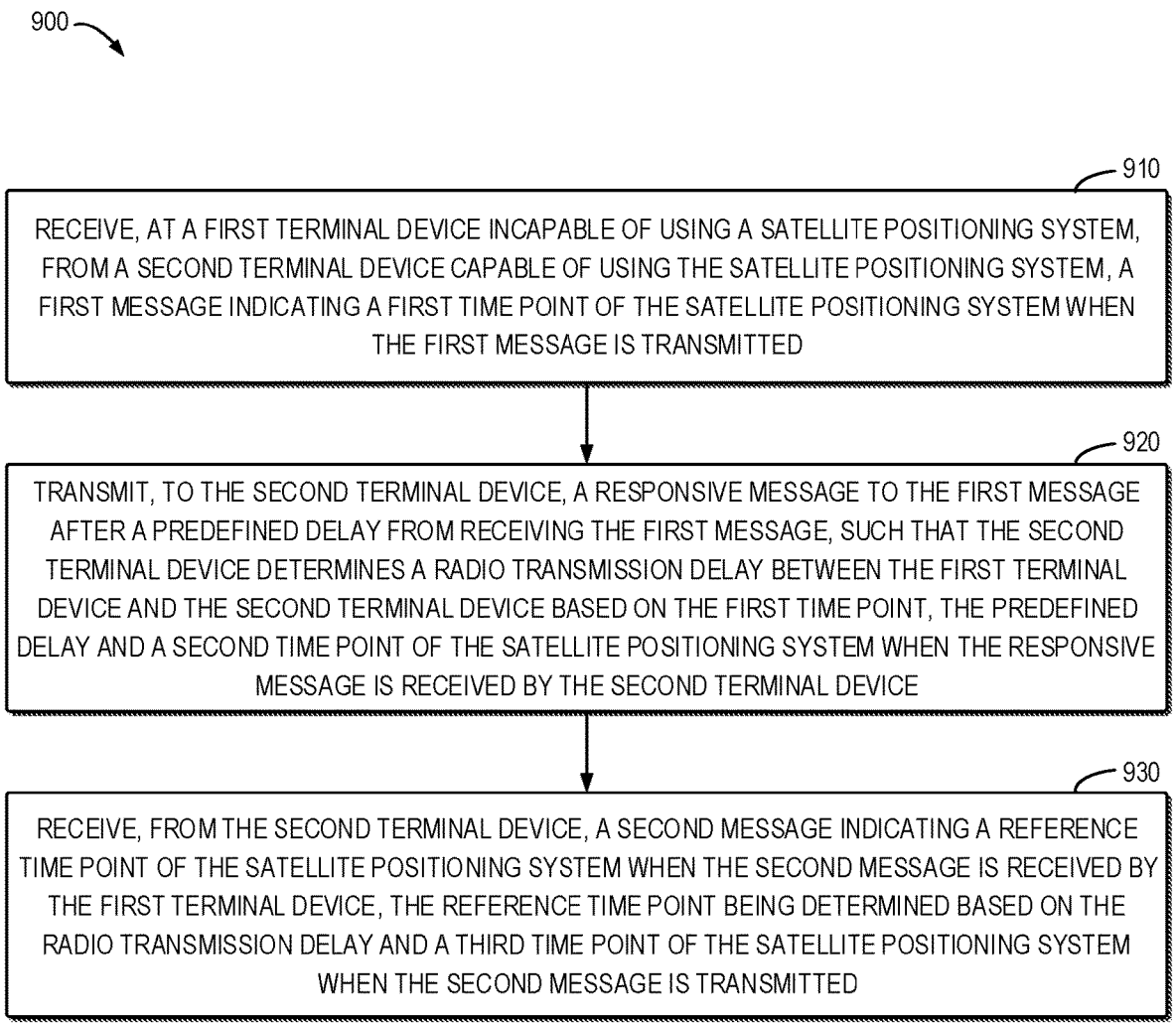
FIG. 9 shows a flowchart of an example method in accordance with some embodiments of the present disclosure.

FIG. 9 shows a flowchart of an example method 900 in accordance with some embodiments of the present disclosure. The method 900 can be implemented at a communication device, such as the first terminal device 120-1 as shown in FIG. 1. Additionally or alternatively, the method 900 can also be implemented at other terminal devices in FIG. 1, as well as other communication devices not shown in FIG. 1.

At block 910, a first terminal device incapable of using a satellite positioning system receiving, from a second terminal device capable of using the satellite positioning system, a first message indicating a first time point of the satellite positioning system when the first message is transmitted.

At block 920, the first terminal device transmits, to the second terminal device, a responsive message to the first message after a predefined delay from receiving the first message, such that the second terminal device determines a radio transmission delay between the first terminal device and the second terminal device based on the first time point, the predefined delay and a second time point of the satellite positioning system when the responsive message is received by the second terminal device.

At block 930, the first terminal device receives, from the second terminal device, a second message indicating a reference time point of the satellite positioning system when the second message is received by the first terminal device, the reference time point being determined based on the radio transmission delay and a third time point of the satellite positioning system when the second message is transmitted.

In some embodiments, the method 900 further comprises: broadcasting a request for locations of a plurality of reference terminal devices capable of using the satellite positioning system; determining, based on the reference time point, a requesting time point of the satellite positioning system when the request is broadcasted; receiving a set of responses to the request from a set of reference terminal devices of the plurality of reference terminal devices, each response including a location of a reference terminal device in the set of reference terminal devices and a transmitting time point of the satellite positioning system when the reference terminal device transmits the response; and determining a location of the first terminal device based on the set of responses.

In some embodiments, determining the location of the first terminal device comprises: for a reference terminal device in the set of reference terminal devices, determining a radio transmission delay between the first terminal device and the reference terminal device, based on the requesting time point, the transmitting time point associated with the reference terminal device, and a predefined delay between receiving the request and the transmitting time point; determining a distance between the first terminal device and the reference terminal device based on the radio transmission delay; and determining the location of the first terminal device based on the locations of the set of reference terminal devices and the distances between the terminal device and the set of reference terminal devices.

In some embodiments, the method 900 further comprises: in accordance with a determination that the set of responses includes more than three responses, selecting three of the set of responses received with radio qualities or radio transmission delays higher than the rest of the set of responses for determining the location of the first terminal device.

In some embodiments, the set of the reference terminal devices includes at least three reference terminal devices.

Figure 10:
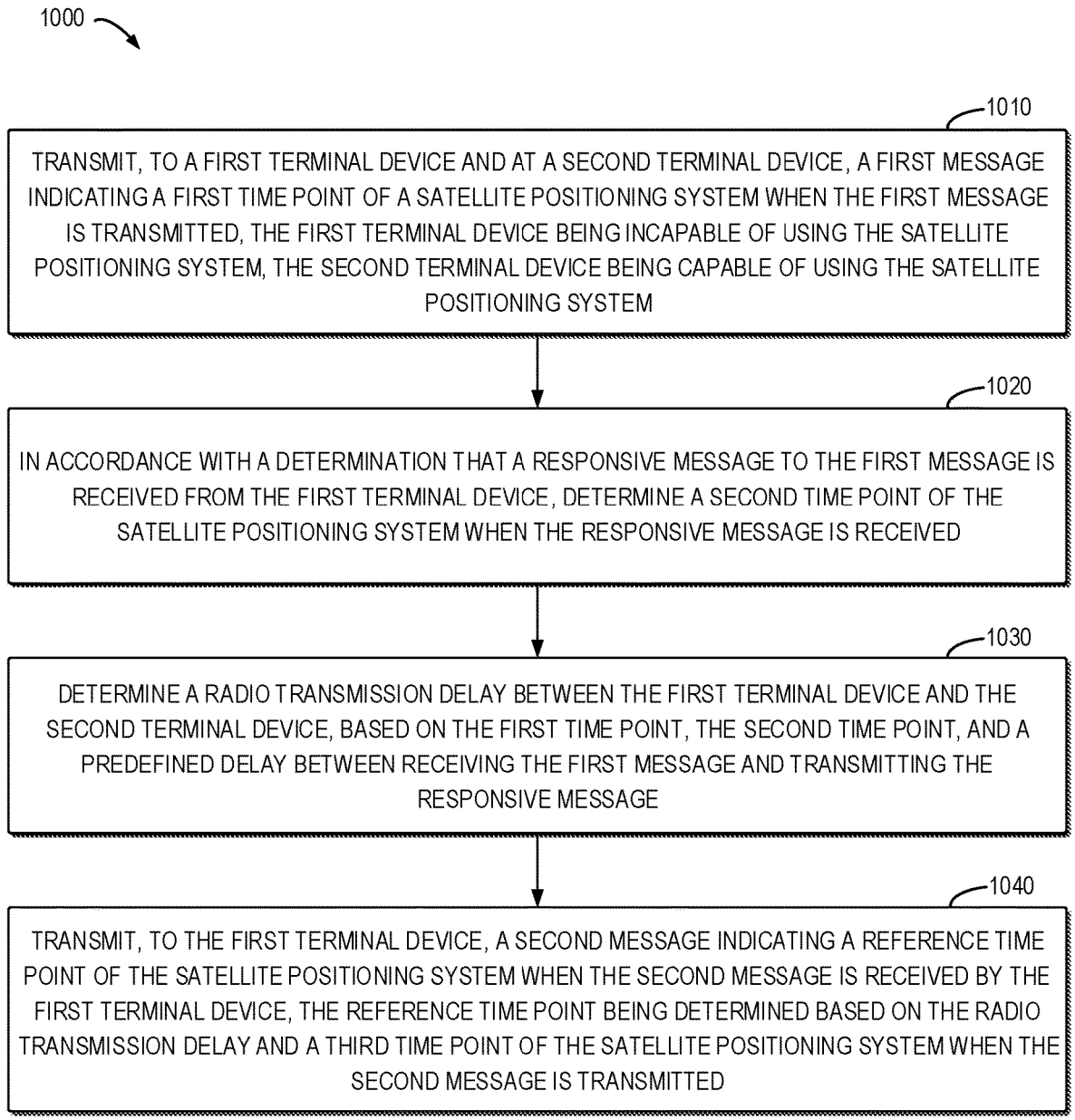
FIG. 10 shows a flowchart of an example method in accordance with some embodiments of the present disclosure.

FIG. 10 shows a flowchart of another example method 1000 in accordance with some embodiments of the present disclosure. The method 1000 can be implemented at a communication device, such as the second terminal device 120-2 as shown in FIG. 1. Additionally or alternatively, the method 1000 can also be implemented at other terminal devices in FIG. 1, as well as other communication devices not shown in FIG. 1.

At block 1010, a second terminal device transmits, to a first terminal device, a first message indicating a first time point of a satellite positioning system when the first message is transmitted, the first terminal device being incapable of using the satellite positioning system, the second terminal device being capable of using the satellite positioning system.

At block 1020, in accordance with a determination that a responsive message to the first message is received from the first terminal device, the second terminal device determines a second time point of the satellite positioning system when the responsive message is received.

At block 1030, the second terminal device determines a radio transmission delay between the first terminal device and the second terminal device, based on the first time point, the second time point, and a predefined delay between receiving the first message and transmitting the responsive message.

At block 1040, the second terminal device transmits, to the first terminal device, a second message indicating a reference time point of the satellite positioning system when the second message is received by the first terminal device, the reference time point being determined based on the radio transmission delay and a third time point of the satellite positioning system when the second message is transmitted.

Figure 11:
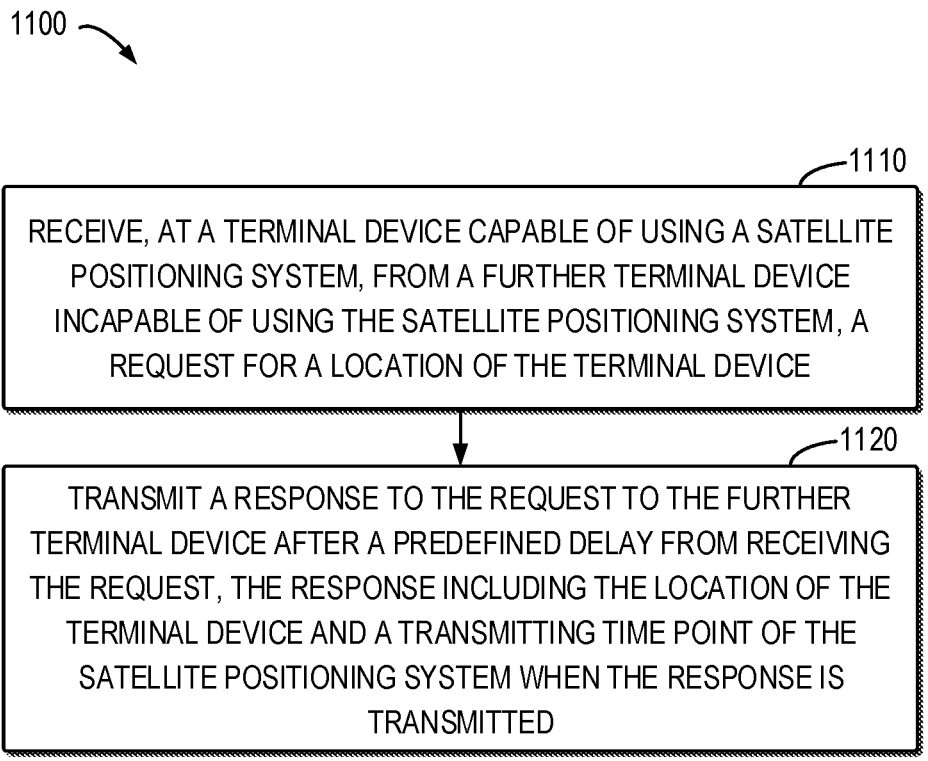
FIG. 11 shows a flowchart of an example method in accordance with some embodiments of the present disclosure.

FIG. 11 shows a flowchart of an example method 1100 in accordance with some embodiments of the present disclosure. The method 1100 can be implemented at a communication device, such as the third terminal device 120-3 as shown in FIG. 1. Additionally or alternatively, the method 1100 can also be implemented at other terminal devices in FIG. 1, as well as other communication devices not shown in FIG. 1.

At block 1110, a terminal device capable of using a satellite positioning system receives, from a further terminal device incapable of using the satellite positioning system, a request for a location of the terminal device.

At block 1120, the terminal device transmits a response to the request to the further terminal device after a predefined delay from receiving the request, the response including the location of the terminal device and a transmitting time point of the satellite positioning system when the response is transmitted.

In some embodiments, the response is transmitted in accordance with a determination that a receiving quality of the request exceeds a predefined threshold.

Figure 12:
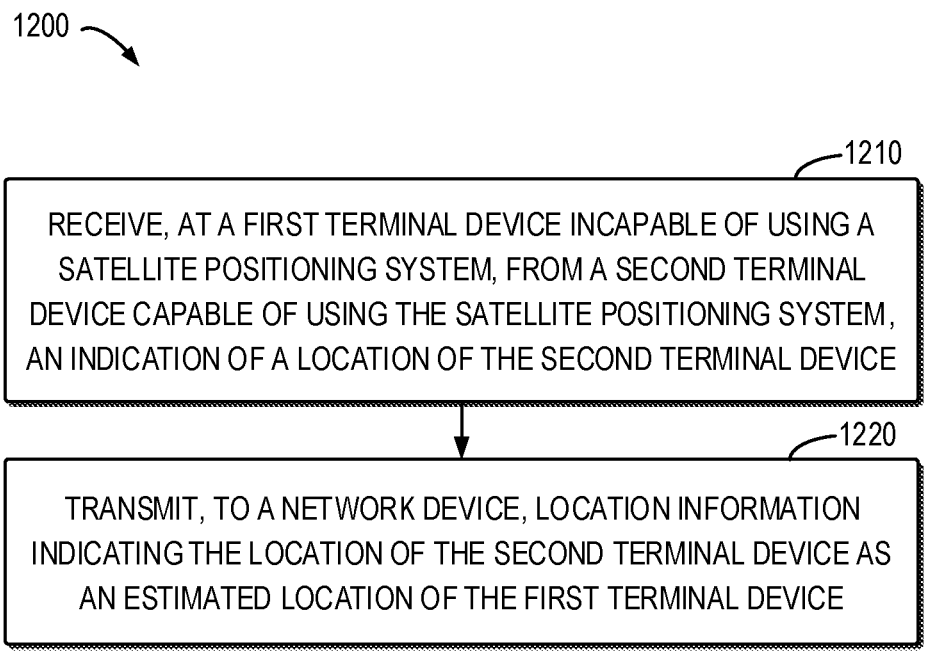
FIG. 12 shows a flowchart of an example method in accordance with some embodiments of the present disclosure.

FIG. 12 shows a flowchart of an example method 1200 in accordance with some embodiments of the present disclosure. The method 1200 can be implemented at a communication device, such as the first terminal device 120-1 as shown in FIG. 1. Additionally or alternatively, the method 1200 can also be implemented at other terminal devices in FIG. 1, as well as other communication devices not shown in FIG. 1.

At block 1210, a first terminal device incapable of using a satellite positioning system receives, from a second terminal device capable of using the satellite positioning system, an indication of a location of the second terminal device.

At block 1220, the first terminal device transmits, to a network device, location information indicating the location of the second terminal device as an estimated location of the first terminal device.

In some embodiments, the method 1200 further comprises: broadcasting a request for locations of terminal devices capable of using the satellite positioning system.

In some embodiments, the method 1200 further comprises: in accordance with a determination that a plurality of indications of locations of a plurality of terminal devices are received, selecting a terminal device associated with one of the plurality of indications received with a highest quality as the second terminal device.

Figure 13:
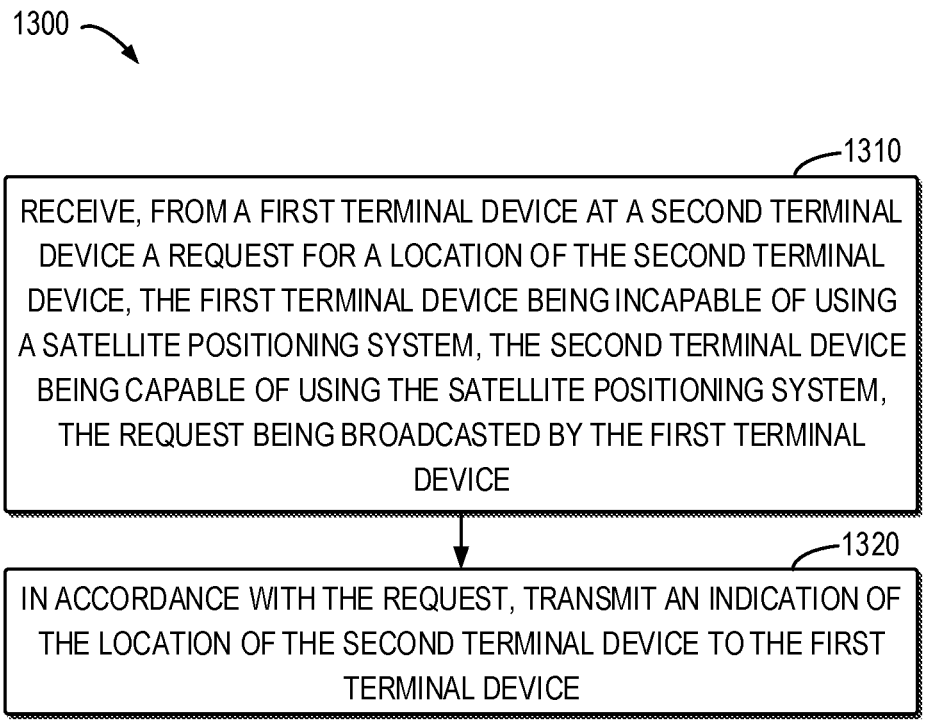
FIG. 13 shows a flowchart of an example method in accordance with some embodiments of the present disclosure.

FIG. 13 shows a flowchart of an example method 1300 in accordance with some embodiments of the present disclosure. The method 1300 can be implemented at a communication device, such as the first terminal device 120-1 as shown in FIG. 1. Additionally or alternatively, the method 1300 can also be implemented at other terminal devices in FIG. 1, as well as other communication devices not shown in FIG. 1.

At block 1310, a second terminal device receives, from a first terminal device, a request for a location of the second terminal device, the first terminal device being incapable of using a satellite positioning system, the second terminal device being capable of using the satellite positioning system, the request being broadcasted by the first terminal device.

At block 1320, in accordance with the request, the second terminal device transmits an indication of the location of the second terminal device to the first terminal device.

Figure 14:
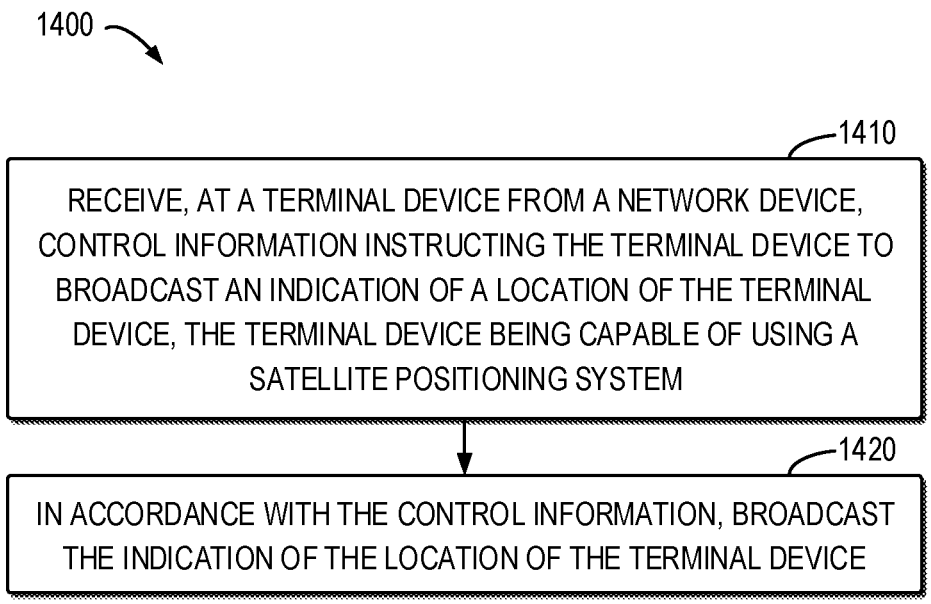
FIG. 14 shows a flowchart of an example method in accordance with some embodiments of the present disclosure.

FIG. 14 shows a flowchart of an example method 1400 in accordance with some embodiments of the present disclosure. The method 1400 can be implemented at a communication device, such as the second terminal device 120-2 as shown in FIG. 1. Additionally or alternatively, the method 1400 can also be implemented at other terminal devices in FIG. 1, as well as other communication devices not shown in FIG. 1.

At block 1410, a terminal device receives, from a network device, control information instructing the terminal device to broadcast an indication of a location of the terminal device, the terminal device being capable of using a satellite positioning system.

At block 1420, in accordance with the control information, the terminal device broadcasts the indication of the location of the terminal device.

In some embodiments, the control information comprises at least one of a power or a periodicity for broadcasting the indication.

In some embodiments, the terminal device is capable of using a plurality of types of satellite positioning system, and the control information comprises an indicated type of satellite positioning system for determining the location of the terminal device.

In some embodiments, the method 1400 further comprises: in accordance with a determination that further control information instructing the terminal device to broadcast the indication of the location of the terminal device using a higher power is received, broadcasting the indication using the higher power.

Figure 15:
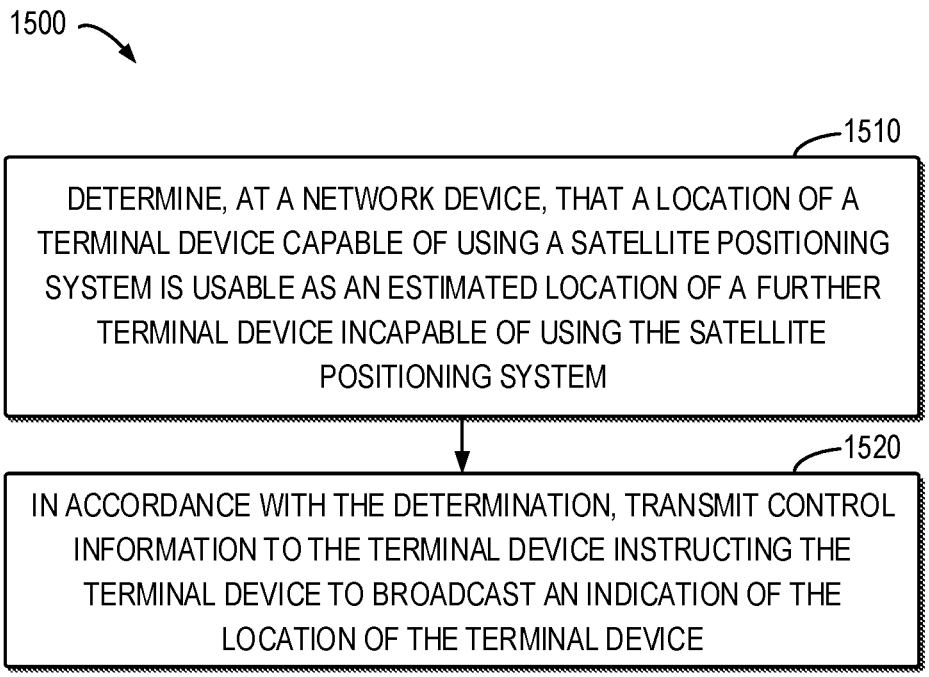
FIG. 15 shows a flowchart of an example method in accordance with some embodiments of the present disclosure.

FIG. 15 shows a flowchart of an example method 1500 in accordance with some embodiments of the present disclosure. The method 1500 can be implemented at a communication device, such as the network device 110 as shown in FIG. 1. Additionally or alternatively, the method 1500 can also be implemented at other network devices as well as other communication devices not shown in FIG. 1.

At block 1510, a network device determines that a location of a terminal device capable of using a satellite positioning system is usable as an estimated location of a further terminal device incapable of using the satellite positioning system.

At block 1520, in accordance with the determination, the network device transmits control information to the terminal device instructing the terminal device to broadcast an indication of the location of the terminal device.

In some embodiments, the control information comprises at least one of a power or a periodicity for broadcasting the indication.

In some embodiments, the terminal device is capable of using a plurality of types of satellite positioning system, and the control information comprises an indicated type of satellite positioning system for determining the location of the terminal device.

In some embodiments, the method 1500 further comprises: in accordance with a determination that no terminal device uses the location of the terminal device as an estimated location for a predefined duration, transmitting further control information instructing the terminal device to broadcast the indication of the location of the terminal device using a higher power.

In some embodiments, the determination is based on at least one of the following: the number of terminal devices in an area in a cell of the network device; capabilities of the terminal devices in the area regarding using the satellite positioning system; and types of satellite positioning system supported by the terminal devices in the area.

Figure 16:
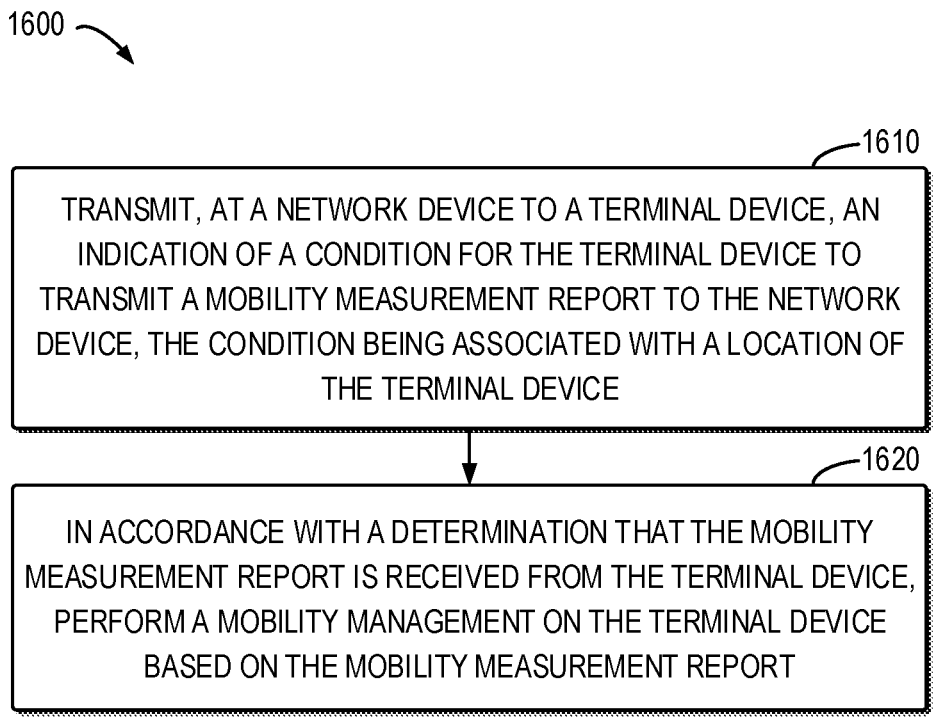
FIG. 16 shows a flowchart of an example method in accordance with some embodiments of the present disclosure.

FIG. 16 shows a flowchart of an example method 1600 in accordance with some embodiments of the present disclosure. The method 1600 can be implemented at a communication device, such as the network device 110 as shown in FIG. 1. Additionally or alternatively, the method 1600 can also be implemented at other network devices as well as other communication devices not shown in FIG. 1.

At block 1610, a network device transmits, to a terminal device, an indication of a condition for the terminal device to transmit a mobility measurement report to the network device, the condition being associated with a location of the terminal device.

At block 1620, in accordance with a determination that the mobility measurement report is received from the terminal device, the network device performs a mobility management on the terminal device based on the mobility measurement report.

In some embodiments, transmitting the indication of the condition comprises at least one of: groupcasting a signal including the indication to a group of terminal devices, the signal being scrambled using a groupcast identifier specific to the group of terminal devices; and broadcasting the indication using a system information block.

In some embodiments, the condition comprises at least one of the following: the location of the terminal device being in an overlapping area of the network device and a neighboring network device; an elevation angle of a satellite carrying the network device with respect to the terminal device being below a first threshold; a distance to a sub-satellite point of the satellite exceeding a second threshold; an elevation angle of a neighboring satellite carrying a neighboring network device of the network device with respect to the terminal device exceeding a third threshold; and a distance to a sub-satellite point of the neighboring satellite being below a fourth threshold.

In some embodiments, the first threshold and the second threshold are determined based on at least one of the following: an altitude of the satellite; and a footprint of a beam of the network device.

In some embodiments, the third threshold and the fourth threshold are determined based on at least one of the following: an altitude of the neighboring satellite; and a footprint of a beam of the neighboring network device.

In some embodiments, the method 1600 further comprises: receiving, from the terminal device along with the mobility measurement report, location information indicating the location of the terminal device.

In some embodiments, the location information comprises a zone identifier of a predefined zone where the terminal device is located in.

In some embodiments, a size of the predefined zone is determined based on at least one of the following: the number of terminal devices served by the network device; an altitude of the satellite; the elevation angle of the satellite; and a footprint of a beam of the network device.

In some embodiments, the zone identifier is globally unique or specific to a cell of the network device.

Figure 17:
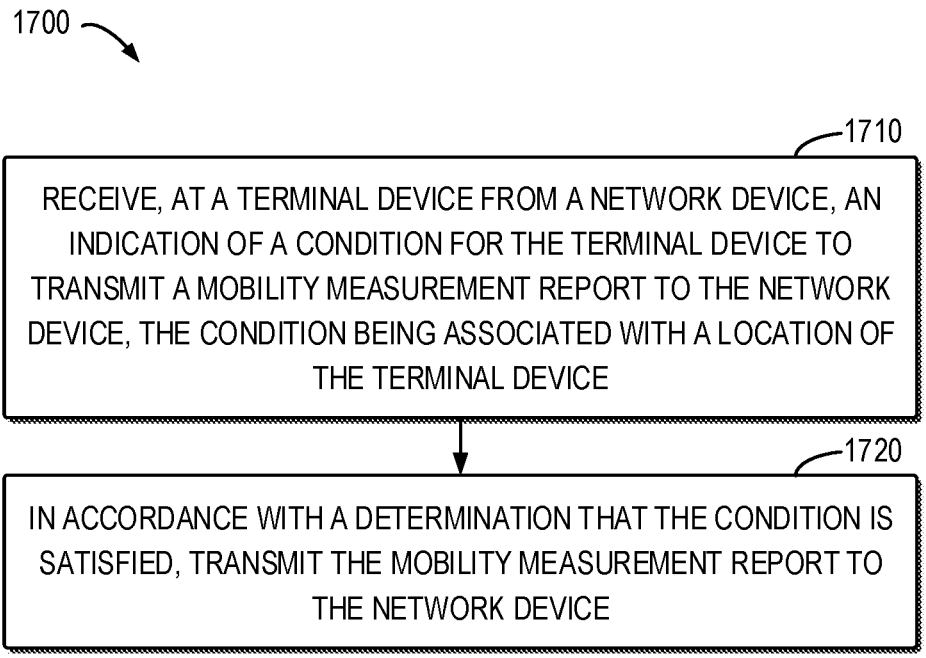
FIG. 17 shows a flowchart of an example method in accordance with some embodiments of the present disclosure.

FIG. 17 shows a flowchart of an example method 1700 in accordance with some embodiments of the present disclosure. The method 1700 can be implemented at a communication device, such as the first terminal device 120-1 as shown in FIG. 1. Additionally or alternatively, the method 1700 can also be implemented at other terminal devices in FIG. 1, as well as other communication devices not shown in FIG. 1.

At block 1710, a terminal device receives, from a network device, an indication of a condition for the terminal device to transmit a mobility measurement report to the network device, the condition being associated with a location of the terminal device.

At block 1720, in accordance with a determination that the condition is satisfied, the terminal device transmits the mobility measurement report to the network device.

In some embodiments, receiving the indication of the condition comprises at least one of: descrambling a groupcasted signal including the indication using a groupcast identifier specific to a group of terminal devices; and receiving the indication in a broadcasted system information block.

In some embodiments, the condition comprises at least one of the following: the location of the terminal device being in an overlapping area of the network device and a neighboring network device; an elevation angle of a satellite carrying the network device with respect to the terminal device being below a first threshold; a distance to a sub-satellite point of the satellite exceeding a second threshold; an elevation angle of a neighboring satellite carrying a neighboring network device of the network device with respect to the terminal device exceeding a third threshold; and a distance to a sub-satellite point of the neighboring satellite being below a fourth threshold.

In some embodiments, the determination comprises: receiving, from the satellite, an indication of a location of the satellite; determining the elevation angle or the distance to the sub-satellite point based on the location of the satellite and the location of the terminal device; and determining that the elevation angle is below the first threshold or the distance to the sub-satellite point exceeds the second threshold.

In some embodiments, the first threshold and the second threshold are determined based on at least one of the following: an altitude of the satellite; and a footprint of a beam of the network device.

In some embodiments, the third threshold and the fourth threshold are determined based on at least one of the following: an altitude of the neighboring satellite; and a footprint of a beam of the neighboring network device.

In some embodiments, the method 1700 further comprises: transmitting, to the network device along with the mobility measurement report, location information indicating the location of the terminal device.

In some embodiments, the location information comprises a zone identifier of a predefined zone where the terminal device is located in.

In some embodiments, a size of the predefined zone is determined based on at least one of the following: the number of terminal devices served by the network device; an altitude of the satellite; the elevation angle of the satellite; and a footprint of a beam of the network device.

In some embodiments, the zone identifier is globally unique or specific to a cell of the network device.

Figure 18:
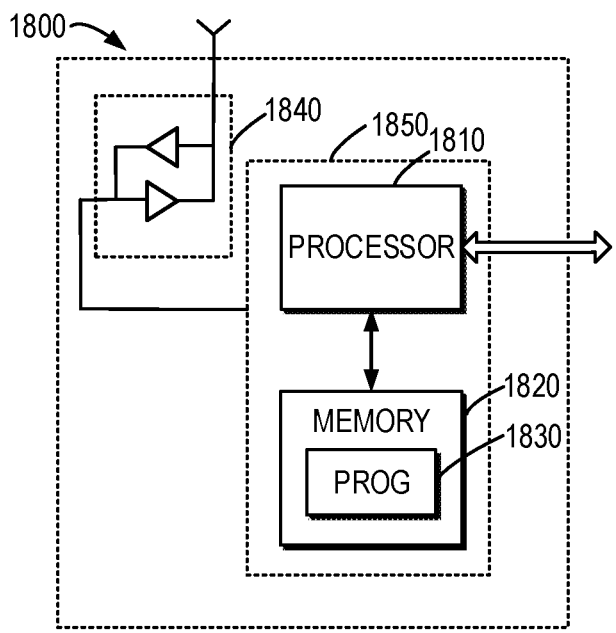
FIG. 18 is a simplified block diagram of a device that is suitable for implementing some embodiments of the present disclosure.

FIG. 18 is a simplified block diagram of a device 1800 that is suitable for implementing some embodiments of the present disclosure. The device 1800 can be considered as a further example embodiment of the first terminal device 120-1, the second terminal device 120-2, the third terminal device 120-3, the fourth terminal device 120-4, the fifth terminal device 120-5, and the network device 110 as shown in FIG. 1. Accordingly, the device 1800 can be implemented at or as at least a part of the first terminal device 120-1, the second terminal device 120-2, the third terminal device 120-3, the fourth terminal device 120-4, the fifth terminal device 120-5, and the network device 110.

As shown, the device 1800 includes a processor 1810, a memory 1820 coupled to the processor 1810, a suitable transmitter (TX) and receiver (RX) 1840 coupled to the processor 1810, and a communication interface coupled to the TX/RX 1840. The memory 1820 stores at least a part of a program 1830. The TX/RX 1840 is for bidirectional communications. The TX/RX 1840 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1830 is assumed to include program instructions that, when executed by the associated processor 1810, enable the device 1800 to operate in accordance with the embodiments of the present disclosure, as discussed herein with reference to FIGS. 9-17. The embodiments herein may be implemented by computer software executable by the processor 1810 of the device 1800, or by hardware, or by a combination of software and hardware. The processor 1810 may be configured to implement various embodiments of the present disclosure. Furthermore, a combination of the processor 1810 and memory 1820 may form processing means 1850 adapted to implement various embodiments of the present disclosure.

The memory 1820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1820 is shown in the device 1800, there may be several physically distinct memory modules in the device 1800. The processor 1810 may be of any type suitable to the local technical network, and may include one or more of general purpose computers, special purpose computers, microprocessors, digital signal processors (DSPs) and processors based on multicore processor architecture, as non-limiting examples. The device 1800 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 9-17. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a first terminal device, the method comprising:
   determining whether a distance between the first terminal device and a first reference location exceeds a first threshold and a distance between the first terminal device and a second reference location is below a second threshold; and
   initiating a measurement reporting procedure in a case where the distance between the first terminal device and the first reference location exceeds the first threshold and the distance between the first terminal device and the second reference location is below the second threshold,
   wherein the first reference location is associated with a center and a range of a serving cell, and the second reference location is associated with a center and a range of a neighbor cell.

2. The method of claim 1, wherein the measurement reporting procedure comprises:
   transmitting measurement results from the first terminal device to a network device.

3. The method of claim 1, wherein the distance between the first terminal device and the second reference location being below the second threshold indicates that the first terminal device is in a coverage of the neighbor cell.

4. A terminal device comprising:
   a processor configured to:
      determine whether a distance between the first terminal device and a first reference location exceeds a first threshold and a distance between the first terminal device and a second reference location is below a second threshold; and
      initiate a measurement reporting procedure in a case where the distance between the first terminal device and the first reference location exceeds the first threshold and the distance between the first terminal device and the second reference location is below the second threshold,
      wherein the first reference location is associated with a center and a range of a serving cell, and the second reference location is associated with a center and a range of a neighbor cell.

5. The terminal device of claim 4, wherein the processor is configured to initiate the measurement reporting procedure by transmitting measurement results from the first terminal device to a network device.

6. The terminal device of claim 4, wherein the distance between the first terminal device and the second reference location being below the second threshold indicates that the first terminal device is in a coverage of the neighbor cell.

* * * * *